United States Patent
Nonaka

(10) Patent No.: US 8,411,314 B2
(45) Date of Patent: Apr. 2, 2013

(54) IMAGE FORMING APPARATUS FOR FORMING AN IMAGE BY TRANSFERRING AN IMAGE ONTO AN INTERMEDIATE TRANSFER MEMBER, IMAGE FORMING METHOD, AND STORAGE MEDIUM

(75) Inventor: Takashi Nonaka, Kunitachi (JP)

(73) Assignee: Canon Kabushiki Kaisha, Tokyo (JP)

( * ) Notice: Subject to any disclaimer, the term of this patent is extended or adjusted under 35 U.S.C. 154(b) by 884 days.

(21) Appl. No.: 12/469,886

(22) Filed: May 21, 2009

(65) Prior Publication Data
US 2009/0296145 A1    Dec. 3, 2009

(30) Foreign Application Priority Data
May 27, 2008   (JP) ................................ 2008-138252

(51) Int. Cl.
*G06K 15/00* (2006.01)
*G06F 3/12* (2006.01)

(52) U.S. Cl. ...................... 358/1.18; 358/1.15; 358/1.13

(58) Field of Classification Search ................. 358/1.18, 358/1.15, 1.13
See application file for complete search history.

(56) References Cited

U.S. PATENT DOCUMENTS

| 6,353,717 | B1 * | 3/2002 | Suzuki | 399/45 |
| 2002/0018674 | A1 | 2/2002 | Miyamura | |
| 2002/0051200 | A1 * | 5/2002 | Chang et al. | 358/1.15 |
| 2006/0269338 | A1 * | 11/2006 | Watanabe | 399/394 |
| 2008/0152391 | A1 * | 6/2008 | Bae et al. | 399/231 |

FOREIGN PATENT DOCUMENTS

| JP | 2000-047452 A | 2/2000 |
| JP | 2004-128911 A | 4/2004 |

* cited by examiner

*Primary Examiner* — Ming Hon
(74) *Attorney, Agent, or Firm* — Canon USA Inc IP Division

(57) ABSTRACT

Controlling an image forming apparatus includes transferring an image of a first page onto an intermediate transfer member, determining whether the image of a second page, which follows, can be transferred side by side with the image of the first page during a time period in which the intermediate transfer member is rotated to a transfer position for the image of the second page, controlling, if a result of the determination is negative and predetermined information has been received, the image of the second page to be transferred side by side with the image of the first page after rotating the intermediate transfer member at least one revolution, and controlling, if the predetermined information has not been received, the transferred image of the first page to be transferred onto the sheet, without transferring the image of the second page side by side with the transferred image of the first page.

14 Claims, 19 Drawing Sheets

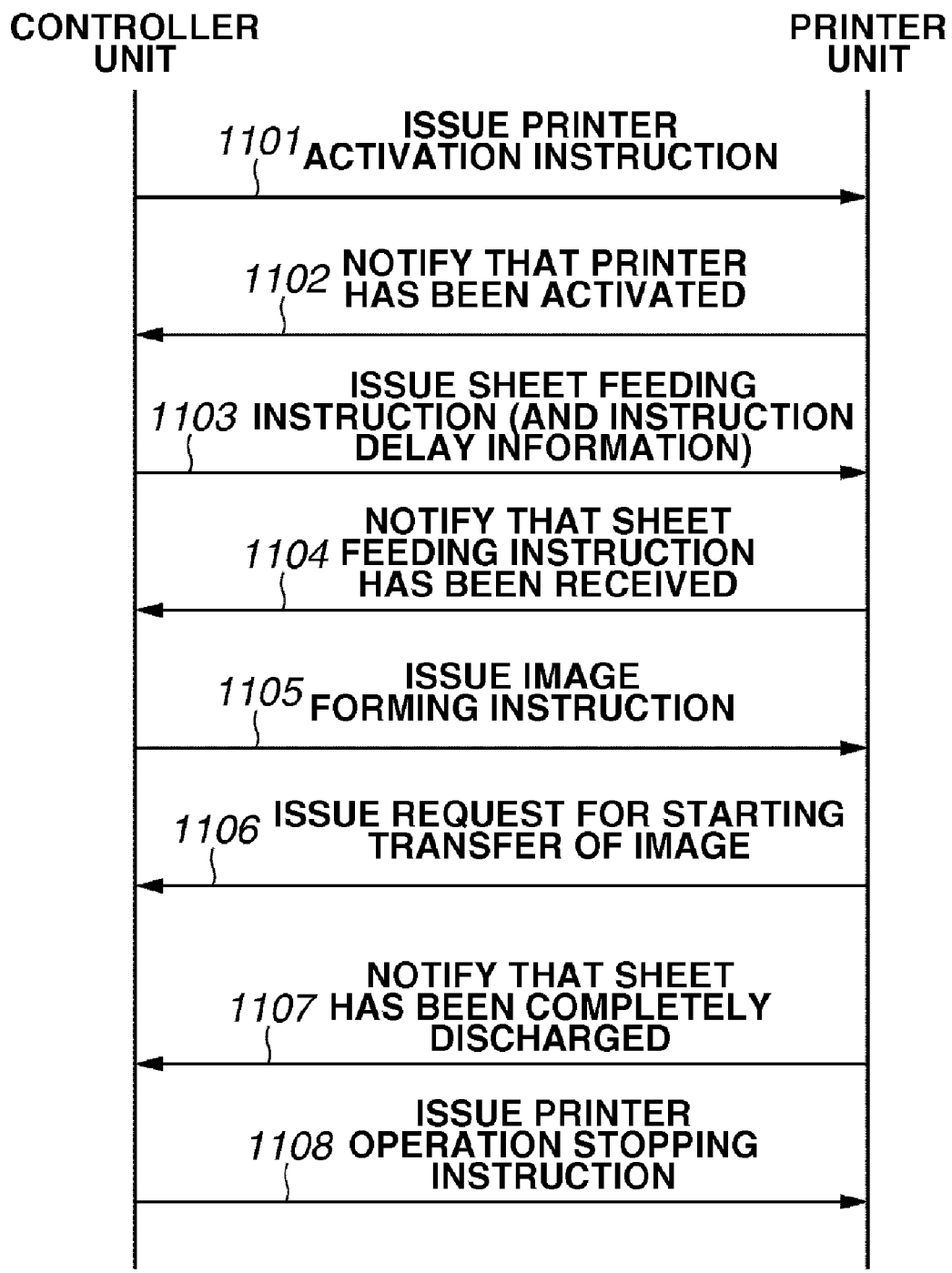

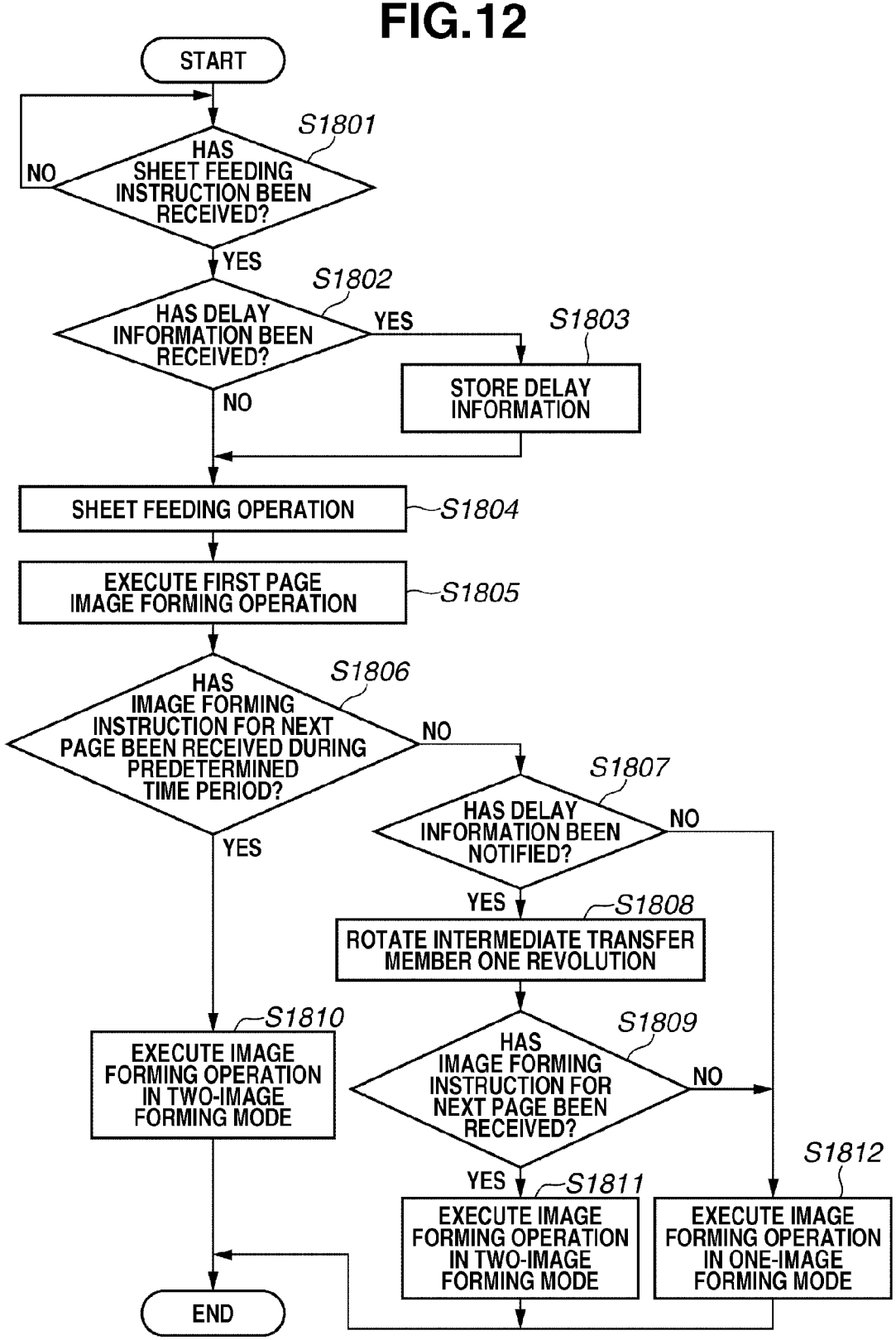

OUTER CIRCUMFERENCE
OF INTERMEDIATE
TRANSFER MEMBER

FIG.16

MEMORY MAP OF STORAGE MEDIUM

DIRECTORY INFORMATION

PROGRAM CODE CORRESPONDING TO STEPS IN FLOW CHART OF FIG. 11

PROGRAM CODE CORRESPONDING TO STEPS IN FLOW CHART OF FIG. 12

IMAGE FORMING APPARATUS FOR FORMING AN IMAGE BY TRANSFERRING AN IMAGE ONTO AN INTERMEDIATE TRANSFER MEMBER, IMAGE FORMING METHOD, AND STORAGE MEDIUM

BACKGROUND OF THE INVENTION

1. Field of the Invention

The present invention relates to an image forming apparatus, an image forming method, and a storage medium.

2. Description of the Related Art

A conventional multifunction peripheral (MFP), which is an example of an image forming apparatus that forms a color image on the sheet, includes a one-drum MFP and a four-drum MFP.

A four-drum MFP includes a plurality of development units and photosensitive drums for color toners of cyan (C), magenta (M), yellow (Y), and black (K). In such a four-drum MFP, each photosensitive drum transfers an image of a corresponding color onto an intermediate transfer member. Then, each color image is transferred onto a sheet. Thus, a four-drum MFP prints the color images.

On the other hand, a one-drum MFP includes one photosensitive drum, which is sharedly used by a plurality of development units for the color toners. In such a one-drum MFP, each color toner is transferred onto an intermediate transfer member via the photosensitive drum. Thus, the one-drum MFP forms an image on the intermediate transfer member.

If the one-drum MFP is used, the number of necessary photosensitive drum(s) is smaller than that in the case of using a four-drum MFP. However, in this case, it is necessary to rotate the intermediate transfer member four revolutions to form an image of one page. That is, it takes a longer time in forming an image of one page than in the case of using a four-drum MFP.

In this regard, Japanese Patent Application Laid-Open No. 2004-128911 discusses a method for forming an image in an image forming mode called "two-image forming mode". More specifically, in a one-image forming mode, an image of one page is transferred onto the intermediate transfer member during one revolution of the intermediate transfer member. On the other hand, in the two-image forming mode, images of two pages are transferred at the same time onto the intermediate transfer member during one revolution of the intermediate transfer member.

When such an MFP is used, in transferring image data from a controller unit to a printer unit of the MFP, the controller unit instructs the printer unit to execute an image forming operation in the two-image forming mode. If it has been instructed to execute printing in the two-image forming mode, the printer unit, at first, transfers the C toner so that images of two pages are transferred onto the intermediate transfer member.

After transferring the C toner onto the intermediate transfer member, the M, Y, and K toners are serially transferred in a page area onto which the C toner has been transferred, while rotating the intermediate transfer member. Then, each of the images of two pages, which have been formed by transferring the C, M, Y, and K toners, is transferred onto the sheet. Thus, the images are printed.

By executing printing in the above-described two-image forming mode, the images of two pages are formed during one revolution of the intermediate transfer member. Thus, the productivity can be improved.

Furthermore, in the method discussed in Japanese Patent Application Laid-Open No. 2004-128911, when the controller unit has instructed the printer unit to execute the two-image forming, if an image of the second page has not been transferred at an appropriate timing after transmitting an image of the first page, then the printer unit does not execute the instructed two-image forming and forms the image in the one-image forming mode. Accordingly, it is not necessary for the printer unit to suspend the image forming operation even when the image has not been transferred from the controller unit at an appropriate timing.

However, in the above-described image forming apparatus, if the two-image forming is temporarily unavailable due to a cause such as the delay of transfer of image data from the controller unit to the printer unit, the image is formed in the one-image forming mode instead of using the two-image forming mode. Accordingly, the productivity of subsequent image forming operations may be degraded.

SUMMARY OF THE INVENTION

According to an aspect of the present invention, an image forming apparatus configured to form an image on a sheet by transferring an image generated based on input image data onto an intermediate transfer member page by page and further transferring the image transferred onto the intermediate transfer member onto the sheet includes a transfer unit for transferring images to the intermediate transfer member, a receiving unit configured to receive predetermined information, a control unit configured to cause the transfer unit to transfer an image of a first page to the intermediate transfer member based on the input image data, and a determination unit configured to determine whether the transfer unit can transfer an image of a second page, which follows the first page, side by side with the image of the first page during a time period in which the intermediate transfer member having the transferred image of the first page is rotated to a transfer position for the image of the second page, wherein the control unit is configured to control, if a result of the determination by the determination unit is negative and the predetermined information has been received by the receiving unit, the transfer unit to transfer, after transferring the image of the first page onto the intermediate transfer member, the image of the second page side by side with the image of the first page after rotating the intermediate transfer member at least one revolution, and configured to control, if the result of the determination by the determination unit is negative and the predetermined information has not been received by the receiving unit, the transfer unit to transfer, after transferring the image of the first page onto the intermediate transfer member, the transferred image of the first page onto the sheet without transferring the image of the second page side by side with the image of the first page.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the present invention.

FIG. 8 illustrates exemplary control processing executed during image forming processing according to an exemplary embodiment of the present invention.

FIG. 12 is a flow chart illustrating exemplary processing for controlling a printer unit according to an exemplary embodiment of the present invention.

FIG. 16 illustrates an exemplary memory map of a storage medium storing a program that can be read by an image forming apparatus according to an exemplary embodiment of the present invention.

DETAILED DESCRIPTION OF THE EMBODIMENTS

Various exemplary embodiments, features, and aspects of the present invention will now be herein described in detail below with reference to the drawings. It is to be noted that the relative arrangement of the components, the numerical expressions, and numerical values set forth in these embodiments are not intended to limit the scope of the present invention.

Figure 1:
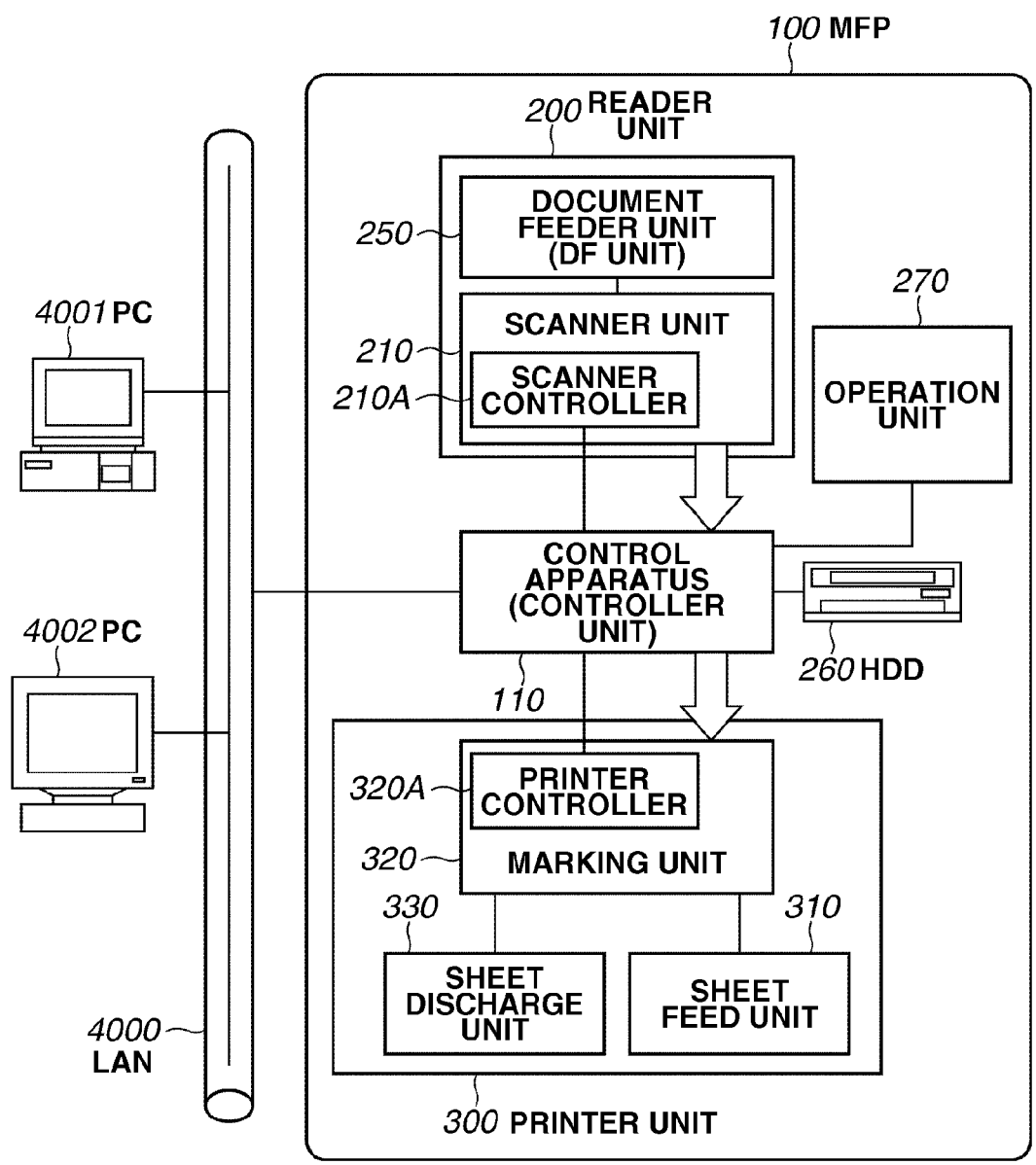
FIG. 1 illustrates an exemplary configuration of an image forming system according to an exemplary embodiment of the present invention.

A first exemplary embodiment of the present invention will now be described below. FIG. 1 illustrates an exemplary configuration of an MFP 100, which is an example of an image forming apparatus according to the present exemplary embodiment.

Referring to FIG. 1, a controller unit 110 is electrically connected with a reader unit 200 and a printer unit 300. The controller unit 110 receives information from the reader unit 200 and the printer unit 300. Furthermore, the controller unit 110 transmits various commands to the reader unit 200 and the printer unit 300.

The controller unit 110 is also connected to personal computers (PCs) 4001 and 4002 via a network 4000. The controller unit 110 receives image data and a control command from the PCs 4001 and 4002 via the network 4000. Ethernet, for example, can be used as the network 4000.

The reader unit 200 optically reads (scans) an image of a document and converts the read document image into image data. The reader unit 200 includes a scanner unit 210 and a document feeding unit 250. The scanner unit 210 has a function for reading an image of a document. The document feeding unit 250 conveys the document sheet to a position at which the scanner unit 210 can read the document image.

A scanner controller 210A controls the document feeding unit 250 and the scanner unit 210 according to an instruction from the controller unit 110.

The printer unit 300 includes a sheet feed unit 310, a marking unit 320, and a sheet discharge unit 330. The sheet feed unit 310 contains print sheets. The marking unit 320 transfers and fixes image data onto a sheet. The sheet discharge unit 330 discharges a printed sheet.

The printer unit 300 feeds a sheet from the sheet feed unit 310, prints image data on the fed sheet, and discharges the printed sheet on the sheet discharge unit 330 according to an instruction from the controller unit 110. The sheet feed unit 310 can store a plurality of types of sheets. The sheet discharge unit 330 can sort or staple the printed sheets.

An operation unit 270 includes hard keys, a liquid crystal display (LCD) unit, and a touch panel unit, which is attached on the LCD unit. A user can input an instruction by operating the hard key and the touch panel unit of the LCD unit.

The operation unit 270 transmits a command corresponding to the instruction input by the user to the controller unit 110. The controller unit 110 executes control according to the received command. Furthermore, the operation unit 270 displays soft keys for receiving a user operation on the MFP 100 on the LCD unit. In addition, the operation unit 270 displays information about a function and a status of the MFP 100.

A hard disk drive (HDD) 260 stores various settings on the MFP 100 and image data. With the above-described configuration, the MFP 100 implements various functions such as a copy function, an image data transmitting function, and a printer function.

In executing the copy function, the controller unit 110 reads image data of a document with the reader unit 200. Then, the controller unit 110 prints the read image data on a sheet by using the printer unit 300. In executing the image data transmitting function, the controller unit 110 converts the image data read by the reader unit 200 into code data. Then, the controller unit 110 transmits the code data to the PCs 4001 and 4002 via the network 4000.

In executing the printer function, the controller unit 110 converts the code data received from the PCs 4001 and 4002 via the network 4000 into image data by analyzing and rasterizing the received code data. Then, the controller unit 110 outputs the image data to the printer unit 300. The printer unit 300 prints the image data received from the controller unit 110. Accordingly, the controller unit 110 is an image processing unit and the printer unit 300 is an image forming unit.

In the present exemplary embodiment, the MFP 100, which has a plurality of functions, is used as an example of the image forming apparatus. However, the present exemplary embodiment is not limited to this. That is, a single function peripheral (SFP), such as a copying machine having a copy function only or a printer having a printer function only can be used as the MFP 100.

Figure 2:
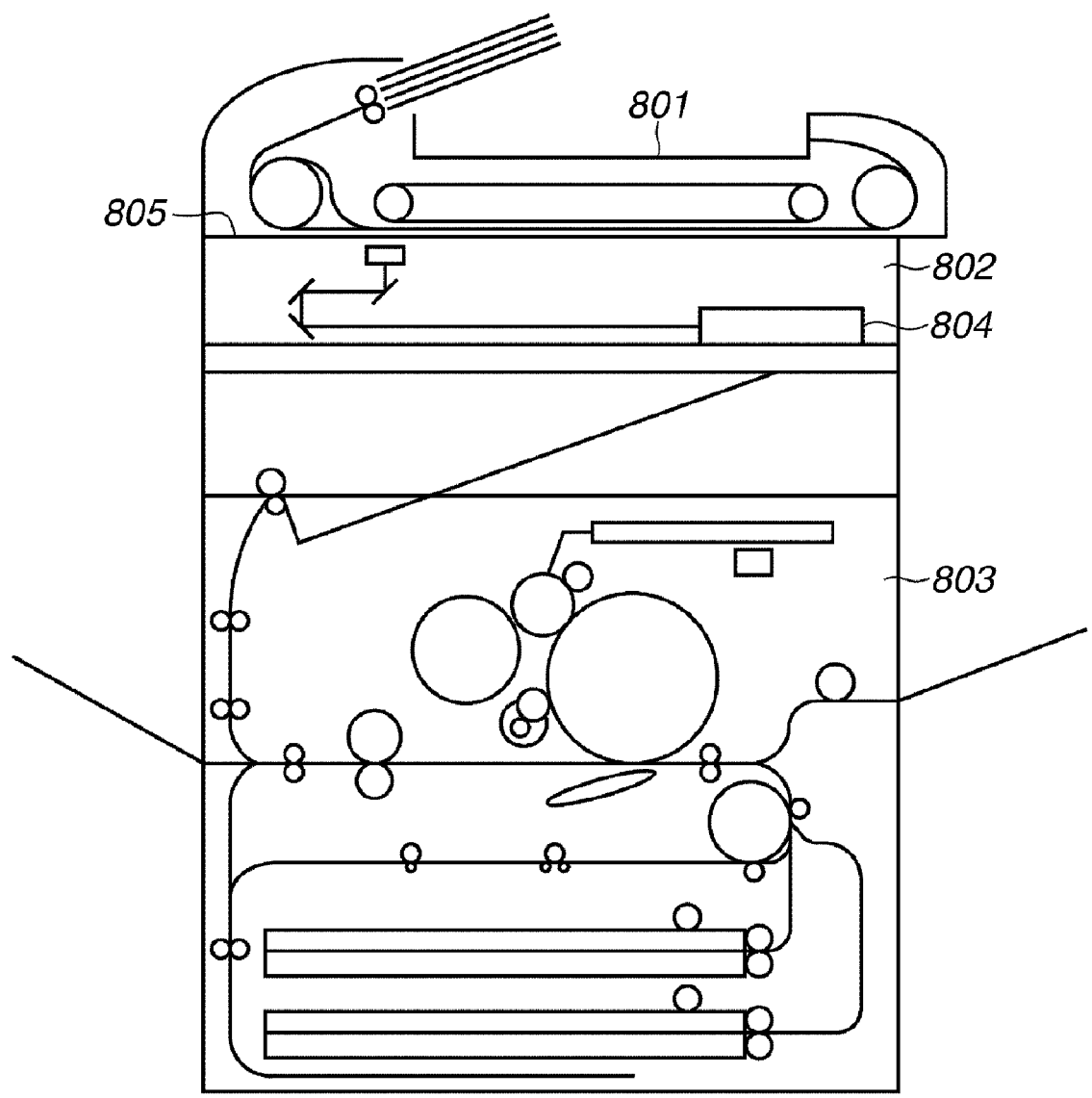
FIG. 2 illustrates an exemplary configuration of an MFP according to an exemplary embodiment of the present invention.

FIG. 2 illustrates an exemplary external appearance of the MFP 100 (FIG. 1) according to the present exemplary embodiment. In the example illustrated in FIG. 2, the MFP 100 is a one-drum color printer, which executes color printing by using one drum. Referring to FIG. 2, a document feeding unit 801 conveys the document to a position at which the document can be optically read. The document feeding unit 801 corresponds to the document feeding unit 250 illustrated in FIG. 1. A scanner unit 802 corresponds to the scanner unit 210 illustrated in FIG. 1. A document on can be conveyed onto a document positioning glass plate 805.

When a document is conveyed on the document positioning glass plate 805 by the document feeding unit 801, the scanner unit 802 scans an image of the document by using an image reading sensor. Then, the scanner unit 802 transmits an optical signal acquired by the scanning to a controller unit 804. The controller unit 804 corresponds to the controller unit 110 illustrated in FIG. 1.

The controller unit 804 generates an image signal based on the received optical signal.

A printer unit 803 corresponds to the printer unit 300 illustrated in FIG. 1. The printer unit 803 executes printing based on the image signal generated by the controller unit 804.

Now, an exemplary configuration of the printer unit 803 will be described in detail below with reference to FIG. 3.

A printer controller 320A controls the entire operation of units included in the printer unit 803. The printer controller 320A rotates a photosensitive member 402 in a counterclockwise direction in FIG. 3 according to an instruction from the controller unit 110. In addition, the printer controller 320A charges the surface of the photosensitive member 402 by using a charging device 419.

Furthermore, a laser driver 401 irradiates the photosensitive member 402 with a laser beam according to the image signal generated by the controller unit 804. Thus, an electrostatic latent image is formed on the surface of the photosensitive member 402.

A development unit 403 executes development by applying a toner (recording agent) of each color onto the electrostatic latent image formed on the surface of the photosensitive member 402 according to an instruction from printer controller 320A.

Then, the toner image on the surface of the photosensitive member 402 is transferred onto an intermediate transfer member 405, which rotates in a clockwise direction. The development unit 403 includes toner development units of five color toners of yellow (Y), magenta (M), cyan (C), black (K), and clear (CL).

Figure 3:
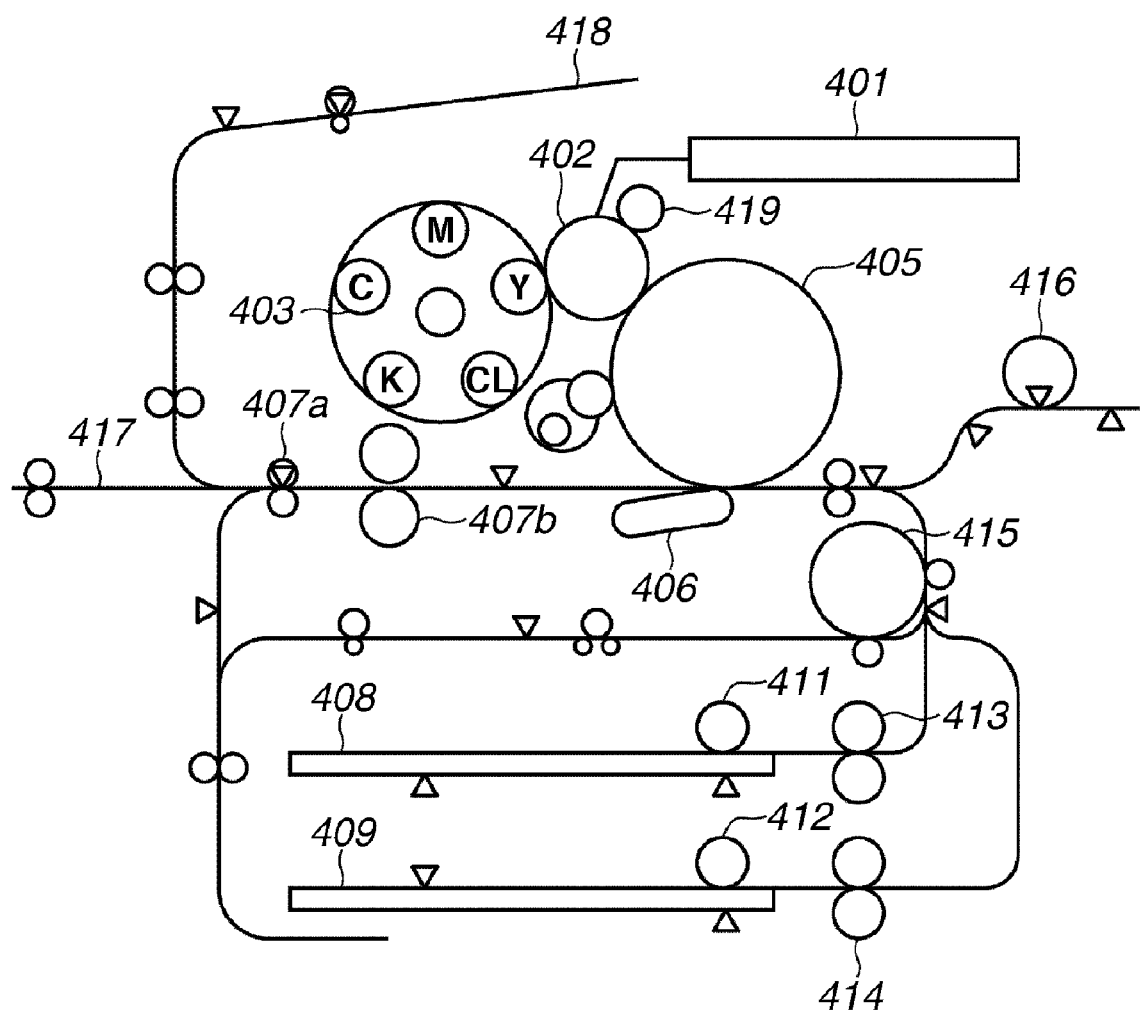
FIG. 3 illustrates an exemplary configuration of a printer unit according to an exemplary embodiment of the present invention.

In executing color printing by using the one-drum MFP 100 illustrated in FIG. 3, the transfer of the toner image onto the intermediate transfer member 405 is executed for each color (toner). More specifically, in transferring an image of one page onto the intermediate transfer member 405, after having transferred the Y toner, the intermediate transfer member 405 is rotated to a position at which the toner image transferred thereon comes to a position at which the toner image contacts the photosensitive member 402 again.

When the toner image transferred onto the intermediate transfer member 405 comes to the toner image contacting position with the photosensitive member 402, the M toner image is transferred onto the intermediate transfer member 405 so that the M toner image is superimposed on the Y toner image.

When the intermediate transfer member 405 is rotated to a position at which the transferred Y and M toner images come to a position at which the Y and M toner images contact the photosensitive member 402, the C toner image is transferred onto the intermediate transfer member 405 so that the C toner image is superimposed on the Y and M toner images. Subsequently, when the intermediate transfer member 405 is rotated to a position at which the transferred Y, M, and C toner images contact the photosensitive member 402, the K toner image is transferred onto the intermediate transfer member 405 so that the K toner image is superimposed on the Y, M, and C toner images.

In addition, when the intermediate transfer member 405 is rotated to a position at which the Y, M, C, and K toner images contact the photosensitive member 402, the CL toner image is transferred onto the intermediate transfer member 405 so that the CL toner image is superimposed on the Y, M, C, and K toner images.

In transferring a plurality of toner images onto the intermediate transfer member 405 in a mutually superimposed manner as described above, the printer controller 320A disables a cleaner (FIG. 3). In this regard, the printer controller 320A executes control for disengaging a transfer belt 406 from the intermediate transfer member 405 so that a plurality of color toner images can be appropriately transferred onto the intermediate transfer member 405. After the toner images formed on the intermediate transfer member 405 have been transferred onto the sheet, the printer controller 320A removes residual toners with the cleaner.

By executing the above-described operations, a color image of one page including the Y, M, C, K, and CL toner images is formed on the surface of the intermediate transfer member 405. In the above-described manner, the MFP 100 transfers the image formed based on the image data input from the reader unit 200 or the PC 4001 on the intermediate transfer member 405 for each page.

Furthermore, the MFP 100 according to the present exemplary embodiment can execute the one-image forming mode or the two-image forming mode. As described above, in the one-image forming mode, an image of one page is transferred onto the intermediate transfer member 405 during one revolution of the intermediate transfer member 405. In the two-image forming mode, images of two pages are transferred at the same time onto the intermediate transfer member 405 during one revolution of the intermediate transfer member 405. The one-image forming mode and the two-image forming mode will be described in detail below. It is not always necessary to transfer toner images of all colors of Y, M, C, K, and CL. That is, it is useful enough to transfer necessary toner images only.

While transferring the toner images onto the intermediate transfer member 405, the printer controller 320A executes control for feeding a sheet from an upper cassette 409 or a lower cassette 409 by using a pickup roller 411 or a pickup roller 412. After conveying the fed sheet to a conveyance roller 415 by using a sheet feed roller 413 or a sheet feed roller 414, the printer controller 320A conveys the sheet to a pre-registration roller by using the conveyance roller 415.

Then, the printer controller 320A conveys the sheet to a nip portion between the intermediate transfer member 405 and the transfer belt 406 at the timing at which the image transferred onto the intermediate transfer member 405 is completely formed. Furthermore, the printer controller 320A transfers the image of one page, which has been formed on the intermediate transfer member 405, onto the sheet by using the transfer belt 406.

After transferring the toner onto the sheet, the printer controller 320A conveys the sheet having the toner image to fixing rollers 407a and 407b. Then, the fixing rollers 407a and 407b applies heat and pressure to the sheet. Thus, the toner image on the sheet is fixed. Then, the printer controller 320A conveys the sheet having the fixed toner image to either a face-up sheet discharge port 417 or a face-down sheet discharge port 418 according to an instruction by the user. The sheet is then discharged from the face-up sheet discharge port 417 or the face-down sheet discharge port 418.

If two-sided printing has been designated, the printer controller 320A conveys the sheet having the fixed image into a reversal sheet conveyance path. The sheet is then reversed by reverse rollers. Then, the sheet is conveyed to the pre-registration roller by the conveyance roller 415 via a two-sided sheet conveyance path.

Furthermore, the printer controller 320A forms an image of the second side (back side) of the sheet by executing the same method as that for forming an image on the first side (front side) of the sheet. Then, the printer controller 320A conveys the sheet having the images on both sides thereof to either the face-up sheet discharge port 417 or the face-down sheet discharge port 418, which has been instructed by the user. Then, the sheet is discharged from the face-up sheet discharge port 417 or the face-down sheet discharge port 418.

By executing the above-described operations, the printer controller 320A can output a sheet having an image formed thereon.

Figure 4:
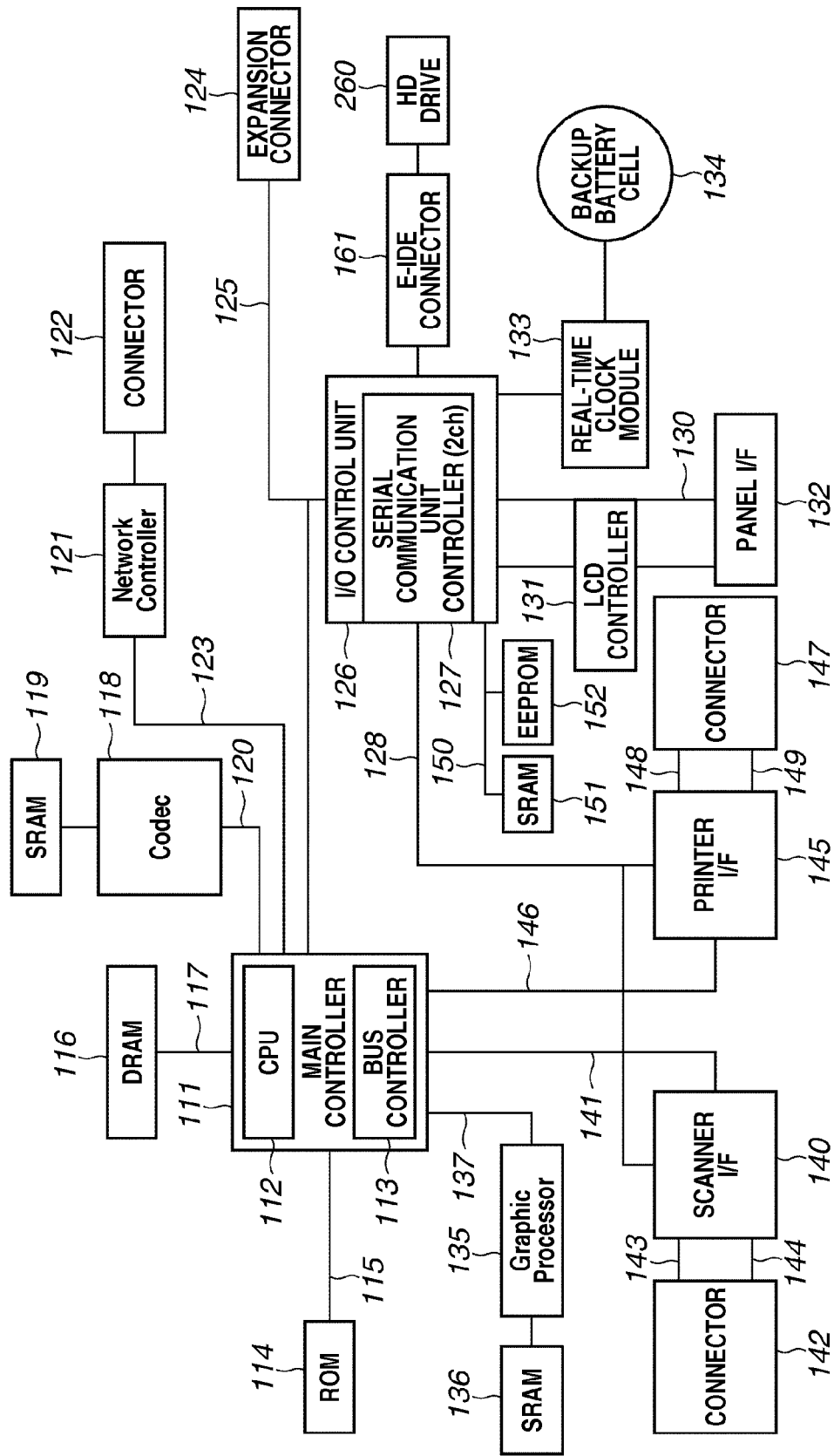
FIG. 4 illustrates an exemplary configuration of a controller unit according to an exemplary embodiment of the present invention.

Now, an exemplary configuration of the controller unit 110 will be described in detail below with reference to FIG. 4. Referring to FIG. 4, a main controller 111 primarily includes a central processing unit (CPU) 112, a bus controller 113, and following various interface (I/F) controller circuits.

The CPU 112 and the bus controller 113 control the entire operation of the controller unit 110. The CPU 112 executes various operations according to a program loaded from a read-only memory (ROM) 114 via a ROM I/F 115. The CPU 112 interprets the code data (page description language (PDL) data, for example) received from the PC 4001 (FIG. 1) or the PC 4002 (FIG. 1) according to the loaded program.

The bus controller 113 controls transfer of data input and output to and from each I/F. More specifically, the bus controller 113 executes bus arbitration and control of direct memory access (DMA) data transfer.

A dynamic random access memory (DRAM) 116 is connected to the main controller 111 via a DRAM I/F 117. The DRAM 116 is used as a work area of the CPU 112 and a temporary storage area for temporarily storing image data.

A codec 118 compresses raster image data stored on the DRAM 116 in a compression method such as Modified Huffman (MH), Modified Read (MR), Modified Modified Read (MMR), Joint Bi-level Image Experts Group (JBIG), or Joint Photographic Experts Group (JPEG). Furthermore, the codec 118 decompresses stored compressed code data into raster image data.

A static random access memory (SRAM) 119 is used as a temporary work area of the codec 118.

The codec 118 is connected to the main controller 111 via an I/F 120. The transfer of data (DMA data transfer) with the DRAM 116 is controlled by the bus controller 113. A graphic processor 135 executes processing, such as image rotation, image magnification, color space conversion, and binarization on the raster image data stored on the DRAM 116. An SRAM 136 is used as a temporary work area of the graphic processor 135. The graphic processor 135 is connected to the main controller 111 via an I/F 137. Data transfer (DMA data transfer) with the DRAM 116 is controlled by the bus controller 113.

A network controller 121 is connected to the main controller 111 via an I/F 123. The network controller 121 is connected to an external network, such as the network 4000, via a connector 122. An expansion connector 124 and an input/output (I/O) control unit 126 are connected to a general-purpose high-speed bus 125. A peripheral component interconnect (PCI) bus can be used as the general-purpose high-speed bus 125.

The I/O control unit 126 includes two channels of a start-stop transmission type serial communication unit controller 127. The serial communication unit controller 127 transmits and receives a control command to and from the CPU of each of the reader unit 200 and the printer unit 300. The I/O control unit 126 is connected to a scanner I/F 140 and a printer I/F 145 via an I/O bus 128. A panel I/F 132 is a data communication interface with the operation unit 270 (FIG. 1).

The panel I/F 132 transfers image data received from an LCD controller 131 to the operation unit 270. Furthermore, the panel I/F 132 transfers a key input signal input by the user by operating keys such as the hard keys or the soft keys displayed on the LCD touch panel of the operation unit 270 to the I/O control unit 126 via a key input I/F 130.

A real-time clock module 133 updates and stores the date and time managed within the MFP 100. A backup battery cell 134 supplies power to the real-time clock module 133. An Enhanced Integrated Drive Electronics (E-IDE) I/F 161 is an interface with the HDD 260. The CPU 112 stores image data on the HDD 260 and reads image data from the HDD 260 via the E-IDE I/F 161.

Connectors 142 and 147 are connected to the reader unit 200 and the printer unit 300, respectively. The connector 142 includes start-stop synchronization serial I/Fs 143 and 148. The connector 147 includes video I/Fs 144 and 149. A scanner I/F 140 is connected to the reader unit 200 via the connector 142. The scanner I/F 140 is connected to the main controller 111 via a scanner bus 141.

The scanner I/F 140 executes predetermined processing on the image received from the reader unit 200. Furthermore, the scanner I/F 140 outputs a control signal generated based on a video control signal from the reader unit 200 to the scanner bus 141. Data transfer from the scanner bus 141 to the DRAM 116 is controlled by the bus controller 113.

A printer I/F 145 is connected to the printer unit 300 via a connector 147. The printer I/F 145 is connected to the main controller 111 via a printer bus 146. The printer I/F 145 executes predetermined processing on image data output from the main controller 111 and then outputs the processed image data to the printer unit 300.

The bus controller 113 controls the transfer of the raster image data rasterized on the DRAM 116 to the printer unit 300. The raster image data is DMA-transferred to the printer unit 300 via the printer bus 146, the printer I/F 145, and the video I/F 149.

An SRAM (memory) 151 is supplied with power from a backup battery cell. Accordingly, the SRAM 151 can hold the stored content when the MFP 100 is powered off. The SRAM 151 is connected to the I/O control unit 126 via a bus 150.

An electrically erasable programmable ROM (EEPROM) 152 is a memory connected with the I/O control unit 126 via the bus 150.

The MFP 100, which has the above-described configuration, can form an image in the one-image forming mode for forming one image at a time or in the two-image forming mode for forming two images at a time. In the present exemplary embodiment, the CL toner is not transferred but the four color toners of Y, M, C, and K are used in printing image data.

In the one-image forming mode, the printer unit 300 of the MFP 100 transfers the toner of one page onto the intermediate transfer member 405 during one revolution of the intermediate transfer member 405. Furthermore, in the one-image forming mode, in executing printing by using four color toners of Y, M, C, and K, color images of one page are transferred onto the intermediate transfer member 405 during four revolutions of the intermediate transfer member 405 because each color toner is transferred during one revolution of the intermediate transfer member 405. In this case, after completely transferring the color images of one page onto the intermediate transfer member 405, the color images on the intermediate transfer member 405 are transferred onto the sheet.

On the other hand, in the two-image forming mode, the printer unit 300 of the MFP 100 transfers the toner so that images of two pages are transferred at a time onto the intermediate transfer member 405 during one revolution of the intermediate transfer member 405. In executing printing by using four color toners of Y, M, C, and K, color images of two pages are transferred onto the intermediate transfer member 405 during at least four revolutions of the intermediate transfer member 405 because each color toner is transferred onto the intermediate transfer member 405 one by one. After completely transferring the color images onto the intermediate transfer member 405, each of the transferred images of two pages is transferred onto two sheets that have been fed.

The printer unit 300 determines which of the one-image forming mode and the two-image forming mode is to be used in executing printing according to an instruction from the controller unit 110.

The flow of data between the controller unit 110 and the printer unit 300 when the MFP 100 executes printing in the one-image forming mode will be described in detail below with reference to FIG. 5.

Figure 5:
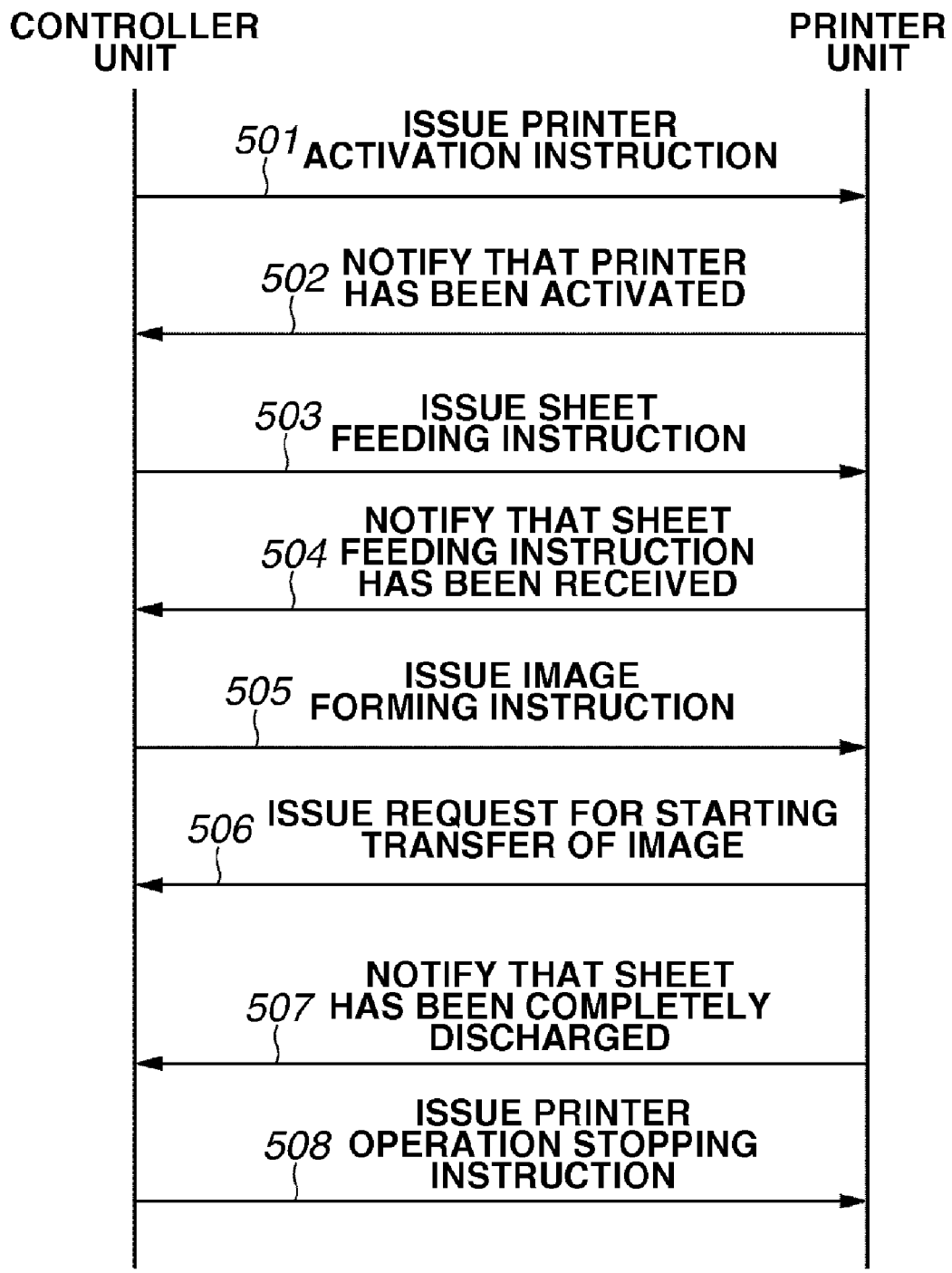
FIG. 5 illustrates exemplary control processing executed during image forming processing according to an exemplary embodiment of the present invention.

Referring to FIG. 5, when a print instruction is input from the PC 4001, the PC 4002, or the operation unit 270, the controller unit 110 issues a printer activation instruction 501 to the printer unit 300. At the same time, the controller unit 110 instructs the printer unit 300 to execute image forming in the one-image forming mode.

After receiving the printer activation instruction 501, the printer unit 300 starts printer activation preparation processing. In this activation preparation processing, the printer unit 300 starts driving a sheet conveyance motor and starts rotating a drum. Thus, the printer unit 300 becomes ready for starting print processing.

Then, the printer unit 300 issues a printer activation notification 502, which notifies that the printer unit 300 has become ready for starting printing, to the controller unit 110. After receiving the notification 502, the controller unit 110 issues a sheet feeding instruction 503 to the printer unit 300.

When the sheet feeding instruction 503 is received, the printer unit 300 issues a sheet feeding instruction receiving notification 504, which notifies that the sheet feeding instruction 503 has been received, to the controller unit 110.

When the preparation for transmitting image data to the printer unit 300 has been completed and when the image data can be input to the printer unit 300, the controller unit 110 issues an image forming instruction 505 to the printer unit 300.

After receiving the image forming instruction 505, the printer unit 300 issues an image transfer start request 506 for each color toner to be transferred onto the intermediate transfer member 405 to the controller unit 110 to request the controller unit 110 to transfer the image data.

If the Y, M, C, and K toners are to be transferred in this order, after receiving the image forming instruction 505, the printer unit 300 at first issues the image transfer start request 506, which requests the controller unit 110 of the transfer of image data for transferring the Y toner. Then, with respect to the M, C, and K toners, the printer unit 300 issues the image transfer start request 506 to the controller unit 110 at the timing of transfer of the same onto the intermediate transfer member 405.

Then, the controller unit 110 transfers the image data of the color requested by the image transfer start request 506 to the printer unit 300. After transferring each color toner onto the intermediate transfer member 405 according to the transferred image data and when the images of one page are completely transferred, the printer unit 300 transfers the transferred image onto the sheet.

After fixing the toner on the sheet, the printer unit 300 discharges the sheet to an outside of the apparatus via the sheet conveyance path. When the sheet is completely discharged, the printer unit 300 issues a sheet discharge completion notification 507 to the controller unit 110, which notifies that the sheet has been completely discharged.

If the sheet is the last page of the input print job, the controller unit 110 issues a printer operation stopping instruction 508. When receiving the printer operation stopping instruction 508, the printer unit 300 stops its operation.

Now, the flow of data between the controller unit 110 and the printer unit 300 when the MFP 100 executes printing of a color image in the two-image forming mode will be described in detail below with reference to FIGS. 6A and 6B.

Figure 6A:
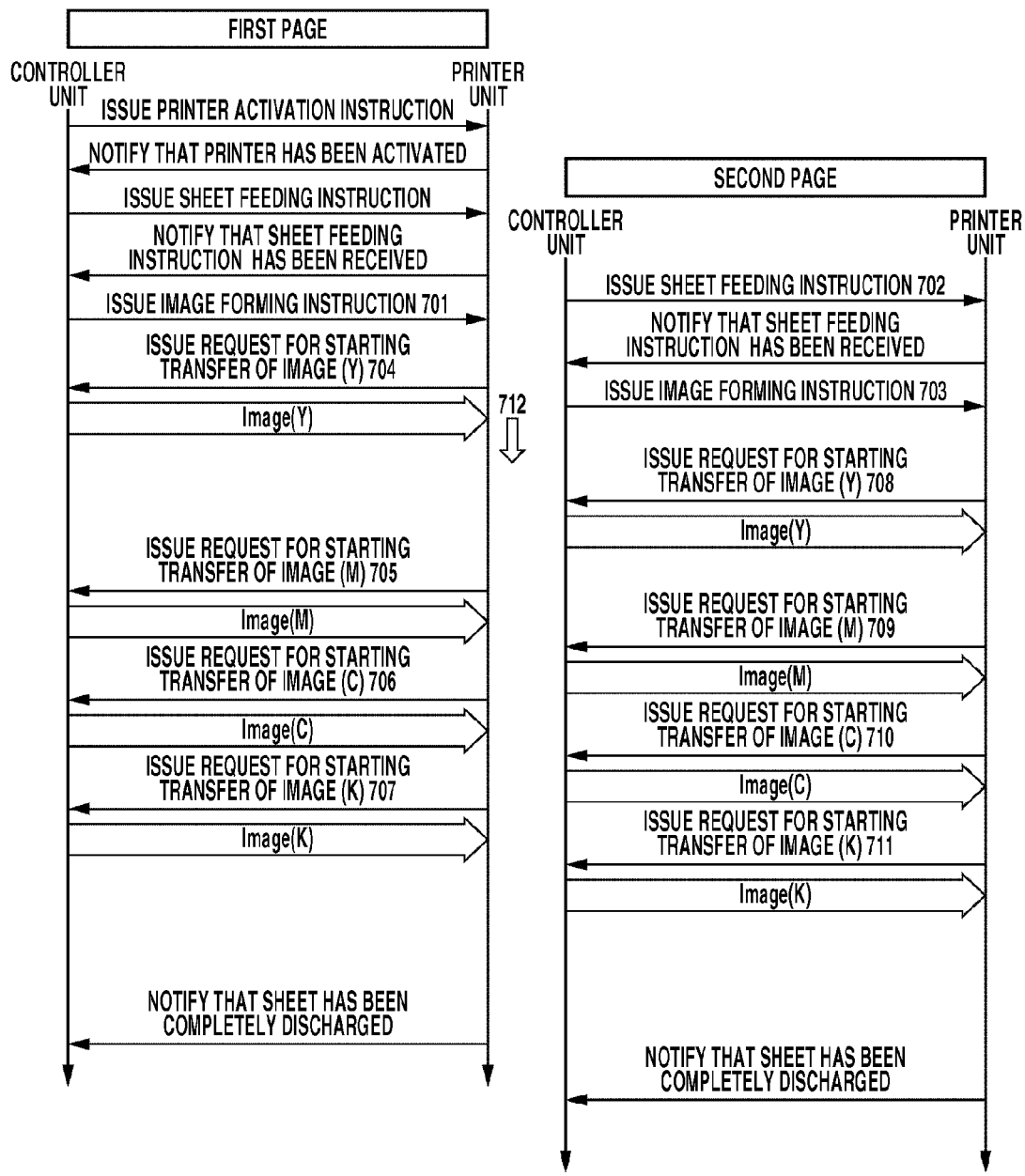
FIGS. 6A and 6B illustrate exemplary control processing executed during image forming processing according to an exemplary embodiment of the present invention.
Figure 6B:
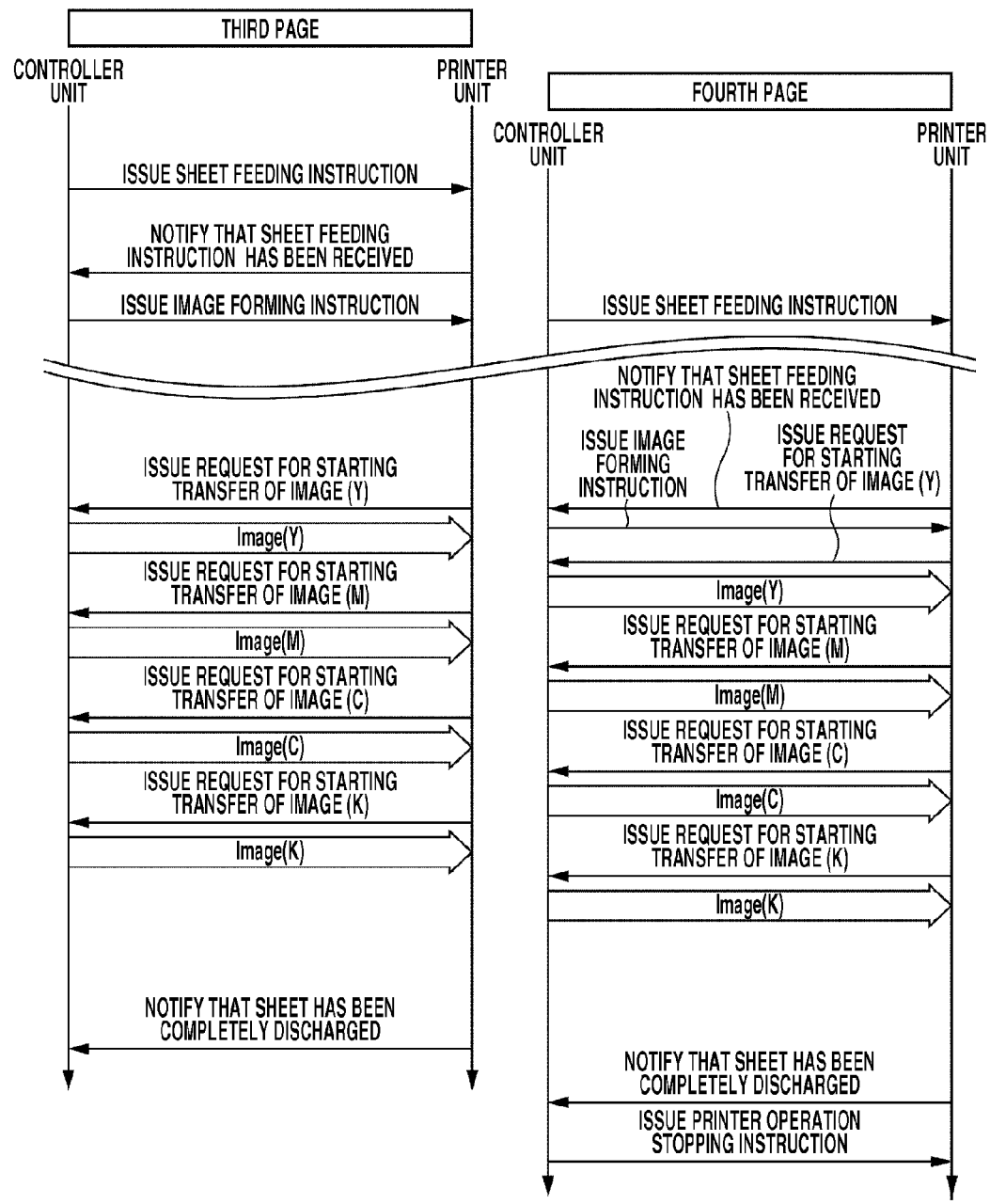

FIGS. 6A and 6B illustrate an example of a sequence executed in forming an image in the following case. That is, the sequence illustrated in FIGS. 6A and 6B is executed when the user desires to print color images of a plurality of pages in a print job including four pages, if the user desires to form images of the first and second pages in the two-image forming mode and images of the third and fourth pages in the two-image forming mode.

When a print instruction is input by the user via the PC 4001, the PC 4002, or the operation unit 270, the controller unit 110 issues a printer activation instruction to the printer unit 300. At the same time, the controller unit 110 instructs the printer unit 300 to execute the instructed image forming in the two-image forming mode.

After receiving the printer activation instruction, the printer unit 300 starts printer activation preparation processing. In this activation preparation processing, the printer unit 300 starts driving the sheet conveyance motor and starts rotating the drum. Thus, the printer unit 300 becomes ready for starting print processing.

Then, the printer unit 300 issues a printer activation notification, which notifies that the printer unit 300 has become ready for starting printing, to the controller unit 110. After receiving the notification, the controller unit 110 issues a sheet feeding instruction to the printer unit 300.

When the sheet feeding instruction is received, the printer unit 300 issues a sheet feeding instruction receiving notification to the controller unit 110. Then, if the image data of the first page is ready to be transmitted to the printer unit 300, the controller unit 110 transmits an image forming instruction 701 to the printer unit 300 with respect to the image of the first page. In addition, after issuing the image forming instruction 701 for the first page image, the controller unit 110 determines whether a subsequent page exists in the print job. If it is determined that no subsequent page exists, then the one-image forming is executed because two-image forming cannot be executed in this case.

On the other hand, if it is determined that a subsequent page exists, then the controller unit 110 issues a sheet feeding instruction 702 to the printer unit 300, which instructs feeding of sheet on which the image of the second page is to be printed. After receiving the sheet feeding instruction 702 for feeding the sheet on which the second page image is to be printed, the printer unit 300 issues a sheet feeding instruction receiving notification to the controller unit 110, which indicates that the sheet feeding instruction 702 has been received.

Then, if the image data of the second page is ready to be transmitted to the printer unit 300, the controller unit 110 transmits an image forming instruction 703 to the printer unit 300 for forming the second page image. Note here that whether the image forming operation can be executed in the two-image forming mode is determined based on a result of determination as to whether the timing of transmitting the image forming instruction 703 is set within a time period 712.

During the time period 712, the second page image can be transferred onto the intermediate transfer member 405 without being superimposed on the first page image from the timing at which the printer unit 300 starts the transfer of the first page image onto the intermediate transfer member 405 to the timing at which one revolution of the intermediate transfer member 405 is completed after the start of transfer.

The example illustrated in FIGS. 6A and 6B illustrates the flow of data between the controller unit 110 and the printer unit 300 when the printer unit 300 receives the image forming instruction 703 for forming the second page image during the time period 712. If the image forming instruction 703 for forming the second page image is received during the time period 712, the printer unit 300 determines that the first page image and the second page image are to be printed in the two-image forming mode.

Furthermore, the printer unit 300 transmits image transfer starting requests 704 through 711 to the controller unit 110 at the timing for transferring each first page color image and each second page color image onto the intermediate transfer member 405.

The controller unit 110 transmits the image data of the color requested by the printer unit 300 in the image transfer starting request to the printer unit 300. The printer unit 300 transfers the image onto the intermediate transfer member 405 according to the received image data.

After the images of two pages have been completely transferred onto the intermediate transfer member 405, the printer unit 300 transfers the image on the intermediate transfer member 405 onto the sheet. Then, the printer unit 300 discharges the sheet having the image to the outside of the apparatus via the sheet conveyance path. When the sheet is completely discharged, the printer unit 300 issues a sheet discharge completion notification to the controller unit 110, which indicates that the sheet has been completely discharged. In a similar manner, the printer unit 300 forms the images of the third and fourth pages in the two-image forming mode.

As described above, in executing image forming processing in the two-image forming mode, the controller unit 110 issues an image forming instruction to the printer unit 300 when the transmission of the image to be transmitted to the printer unit 300 becomes ready with respect to each page.

If the image forming instruction is received during the time period 712, the printer unit 300 executes the image forming in the two-image forming mode. On the other hand, if no image forming instruction has been received during the time period 712, the printer unit 300 shifts the mode to the one-image forming mode in executing the image forming operation even when the two-image forming mode has been designated by the user. In this case, it takes a longer time in completing printing compared to a case of forming an image in the two-image forming mode.

Figure 7A:
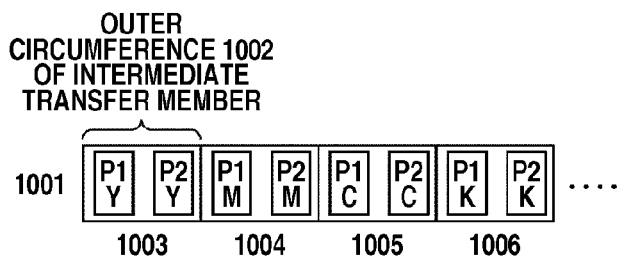
FIGS. 7A and 7B each illustrate time taken for executing the image forming processing according to an exemplary embodiment of the present invention.
Figure 7B:
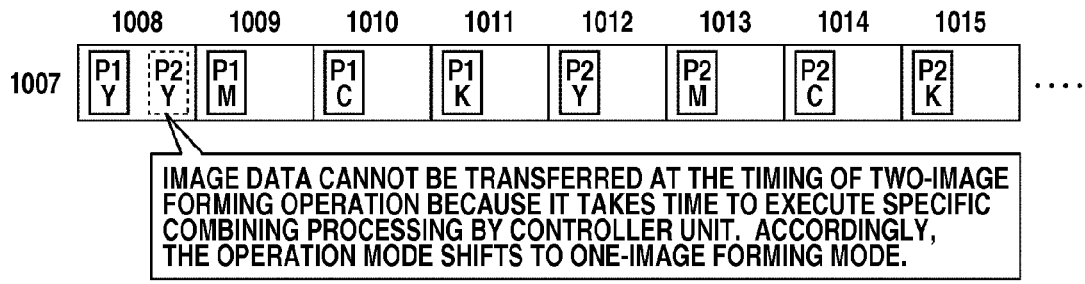

FIGS. 7A and 7B each illustrate time taken for executing the image forming processing with respect to the one-image forming mode and the two-image forming mode. Referring to FIG. 7A, images 1003 through 1006 are transferred from each color development unit of the development unit 403 onto the intermediate transfer member 405 within a time sequence 1001.

The images 1003 through 1006 (FIG. 7A) and images 1008 through 1015 (FIG. 7B) each are transferred onto the intermediate transfer member 405 during one revolution of the intermediate transfer member 405. A time period 1002 of the time sequence 1001 indicates the length of a period of time equivalent to one revolution of the intermediate transfer member 405 (the outer circumferential dimension of the intermediate transfer member 405).

In forming an image in the two-image forming mode, an image pair 1003, which include the images of P1 (page 1 (first page)) and P2 (page 2 (second page)), is transferred by using the Y toner during the first revolution of the intermediate transfer member 405 within the time period 1002 of the time sequence 1001. Then, the pages P1 and P2 are further transferred by using the M toner in the second revolution of the intermediate transfer member 405, as indicated with an image pair 1004. Subsequently, the pages P1 and P2 are further transferred by using the C toner in the third revolution of the intermediate transfer member 405, as indicated with an image pair 1005. Then, the pages P1 and P2 are further transferred by using the K toner in the fourth revolution of the intermediate transfer member 405, as indicated with an image pair 1006.

During the four revolutions of the intermediate transfer member 405, the color images of two pages are transferred onto the intermediate transfer member 405 in the above-described manner.

The images formed by using the Y, M, C, and K toners are transferred onto the intermediate transfer member 405 so that they are overlapped one another as the images of the pages P1 and P2. However, after transferring the Y toner image of the page P1 onto the intermediate transfer member 405 in the time period 1002, if the image data of the page P2 has not been transferred from the controller unit 110 at an appropriate timing, the image forming operation cannot be executed the two-image forming mode.

In this case, a conventional method changes the operation mode to the one-image forming mode in a time sequence 1007 (FIG. 7B). In this regard, in forming an image in the one-image forming mode, an image of one page only is formed in each of the areas 1008 through 1015 during one revolution of the intermediate transfer member 405. Accordingly, it takes twice as long a time in completely forming the images (in the areas 1008 through 1015) than in the case of using the two-image forming mode, in which the images of two pages are transferred in each of the areas 1003 through 1006. Therefore, the productivity of forming an image in the one-image forming mode is lower than that in the case of using the two-image forming mode.

With respect to the cause of the possible delay of preparation of the image of the second page by the controller unit 110, a page number printing function, a number-of-copies printing function, and an image combining function may cause the delay in the preparation of the second page image.

The page number printing function is a function for combining an image indicating the page number with the read document image and outputting the combined image. The number-of-copies printing function is a function for combining an image indicating the number of copies with the read document image and outputting the combined image. The image combining function is a function for combining an image to be combined, which is previously registered and stored on the HDD 260, with the image data read by the reader unit 200 or transmitted from the PCs 4001 and 4002 and outputting the combined image.

If any of these functions are executed, it becomes likely that the delay in preparing the second page image by the controller unit 110 occurs. In the present exemplary embodiment, in order to suppress the possible degradation of the productivity caused by the delay in transmitting the image data from the controller unit 110, the controller unit 110 executes control illustrated in FIG. 8.

More specifically, the controller unit 110 transmits a printer activating instruction 1101 to the printer unit 300. When the printer unit 300 is successfully activated, the controller unit 110 issues a printer activation notification 1102 to the printer unit 300.

If it has been instructed to execute the page number printing function, the number-of-copies printing function, or the image combining function, then the controller unit 110 transmits information indicating that the image forming instruction may be delayed (hereinafter simply referred to as "delay information") to the printer unit 300 in addition to a sheet feeding instruction 1103.

If the printer unit 300 has recognized that the transmission of an image forming instruction 1105 from the controller unit 110 may be delayed according to the delay information, the printer unit 300 executes control for avoiding immediately changing the printing mode to the one-image forming mode even if the image forming instruction 1105 is not received during the time period 712 (FIGS. 6A and 6B).

More specifically, if the printer unit 300 has received the delay information from the controller unit 110 and if the image forming instruction 1105 has not been received during the time period 712, then the printer unit 300 additionally rotates the intermediate transfer member 405 one revolution and monitors whether the image forming instruction 1105 is received during the additional one revolution of the intermediate transfer member 405.

If the image forming instruction 1105 is not received during the additional one revolution of the intermediate transfer member 405, the printer unit 300 executes the image forming operation in the one-image forming mode. On the other hand, if the image forming instruction 1105 is received during the additional one revolution of the intermediate transfer member 405, the printer unit 300 executes the image forming operation in the two-image forming mode.

Now, control executed in printing the images of the first through the fourth pages among images of a plurality of pages according to the control illustrated in FIG. 8 will be described in detail below with reference to FIGS. 9A and 9B.

Figure 9A:
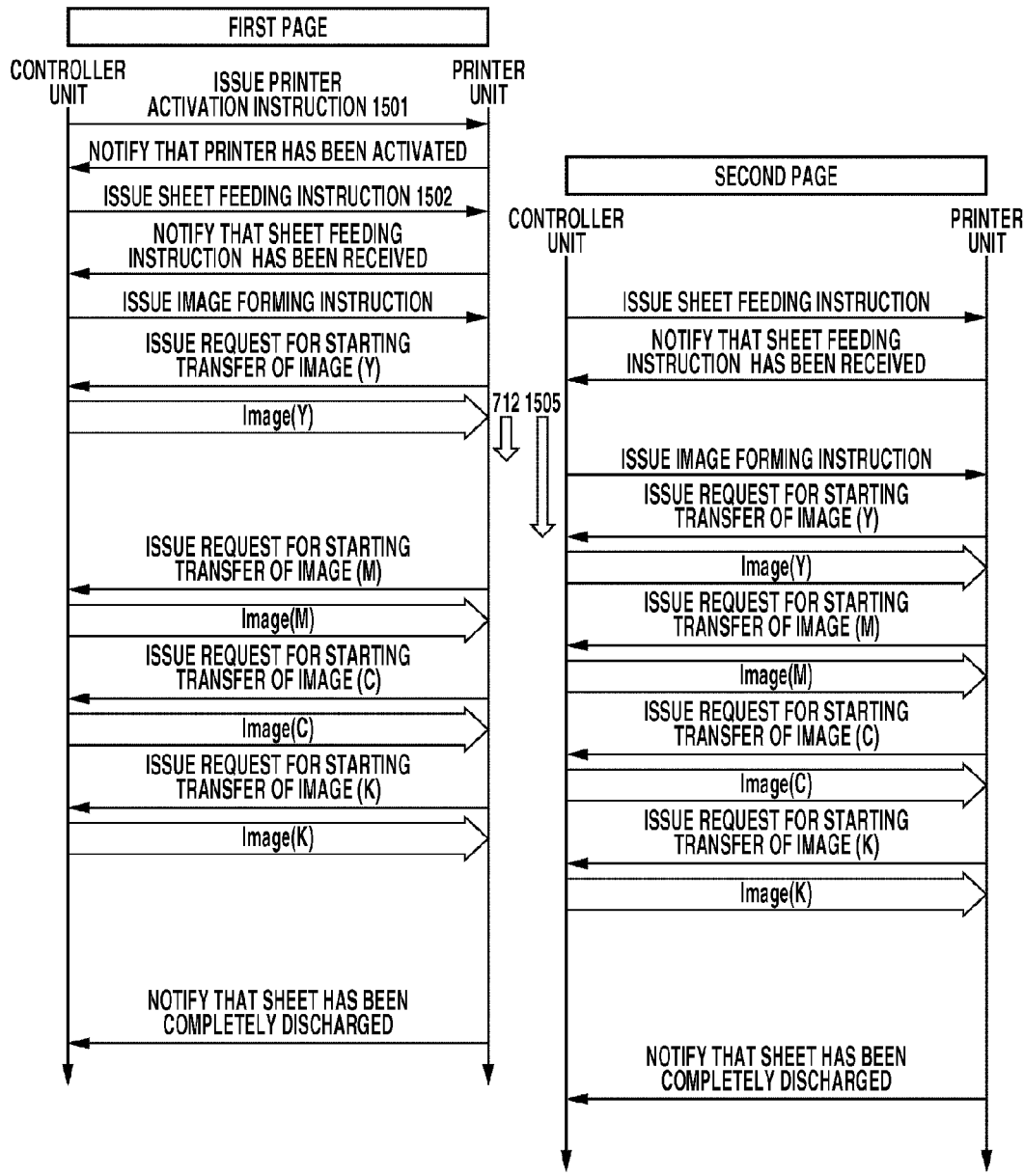
FIGS. 9A and 9B illustrate exemplary control processing executed during image forming processing according to an exemplary embodiment of the present invention.
Figure 9B:
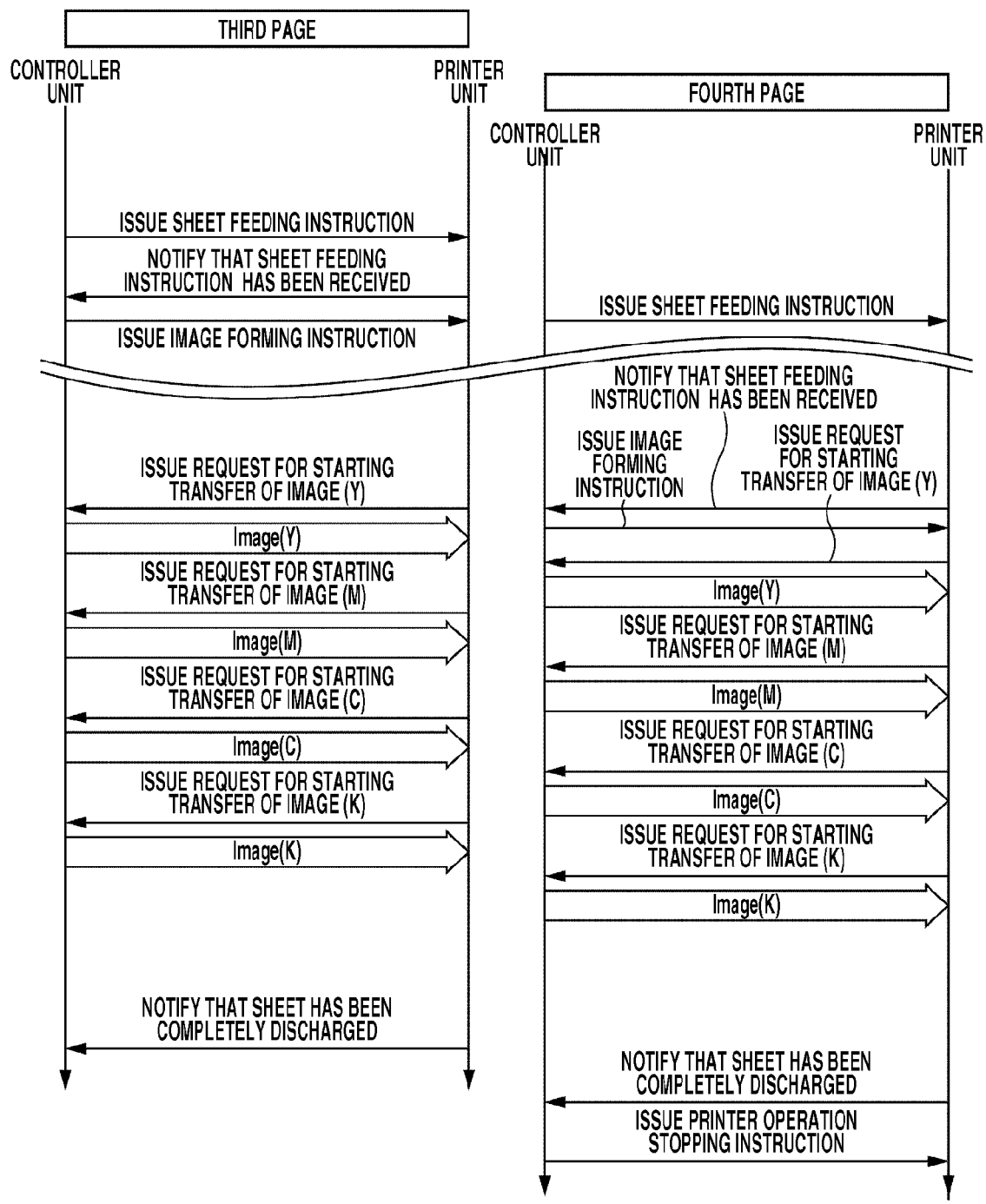

In the example illustrated in FIGS. 9A and 9B, the following print setting has been set. That is, the user has designated the two-image forming mode as the print mode and has also designated to combine an image indicating the page number or the number-of-copies or a specific image with the image to be printed.

The user sets the print setting via the operation unit 270 or via an operation screen of the PC 4001 or the PC 4002. After receiving the print setting from the user, the controller unit 110 issues a print starting instruction 1501. After receiving the print starting instruction 1501 from the controller unit 110, the printer unit 300 issues a print start notification to the controller unit 110 in response to the print starting instruction 1501. Furthermore, after receiving the print start notification, the controller unit 110 issues a sheet feeding instruction 1502 to the printer unit 300.

If it has been instructed to execute the page number printing function, the number-of-copies printing function, or the image combining function, then the controller unit 110 transmits information indicating that the image forming instruction may be delayed (the delay information) to the printer unit 300.

In response to the sheet feeding instruction, the printer unit 300 transmits a sheet feeding instruction receiving notification to the controller unit 110. In addition, the printer unit 300 stores the received delay information on a memory of the printer unit 300.

When the controller unit 110 receives the sheet feeding instruction receiving notification from the printer unit 300, the controller unit 110 determines whether the analysis, rasterization, and image combining processing on the first page image to be transmitted to the printer unit 300 have been completed and whether the transmission preparation has been completed.

If it is determined that the first page image is ready to be transmitted, then the controller unit 110 transmits an image forming instruction to the printer unit 300. After receiving the image forming instruction for forming the first page image, the printer unit 300 transmits a first page image transfer request to the controller unit 110.

According to the received first page image transfer request, the controller unit 110, at first, transmits Y image data to the printer unit 300. Then, the printer unit 300 transfers the Y image onto the intermediate transfer member 405 based on the received Y image data.

According to the user instruction for forming the image in the two-image forming mode, the printer unit 300 waits until an instruction for forming the second page image is received from the controller unit 110.

In this case, in a conventional method, a printer unit waits for a second page image forming instruction during the time period 712 and changes the print mode to the one-image forming mode if the image forming instruction is not received during the time period 712. In the present exemplary embodiment, instead of shifting to the one-image forming mode, the printer unit 300 determines whether the delay information has been received.

If it is determined that the delay information has been received, then the printer unit 300 waits until the second page image forming instruction is received from the controller unit 110 during a time period 1505. The time period 1505 includes the time taken for additionally rotating the intermediate transfer member 405 one revolution in addition to the length of the time period 712.

If the printer unit 300 has not received the second page image forming instruction from the controller unit 110 during the time period 1505, the printer unit 300 changes to the one-image forming mode and executes the image forming operation in the one-image forming mode.

On the other hand, if the printer unit 300 has received the second page image forming instruction from the controller unit 110 during the time period 1505, the printer unit 300 executes the image forming operation in the two-image forming mode.

In the example illustrated in FIGS. 9A and 9B, it has been instructed by the user to combine the image indicating the page number, the image indicating the number of copies, or a specific image with the image to be printed. Furthermore, the controller unit 110 has transmitted the delay information to the printer unit 300. In addition, in this example, the printer unit 300 has not received the image forming instruction during the time period 712 but has received the image forming instruction during the time period 1505.

That is, according to the delay information received from the controller unit 110, the printer unit 300 has extended the time period for determining whether to execute the image forming operation in the two-image forming mode from the time period 712 to the time period 1505. If the printer unit 300 receives the image forming instruction during the time period 1505, the printer unit 300 executes the image forming operation in the two-image forming mode.

The above-described control for printing the first and second pages is also executed in printing the third and fourth pages.

On the other hand, if the printer unit 300 has not received the image forming instruction from the controller unit 110 during the time period 1505, the printer unit 300 executes the image forming operation in the one-image forming mode.

Figure 10:
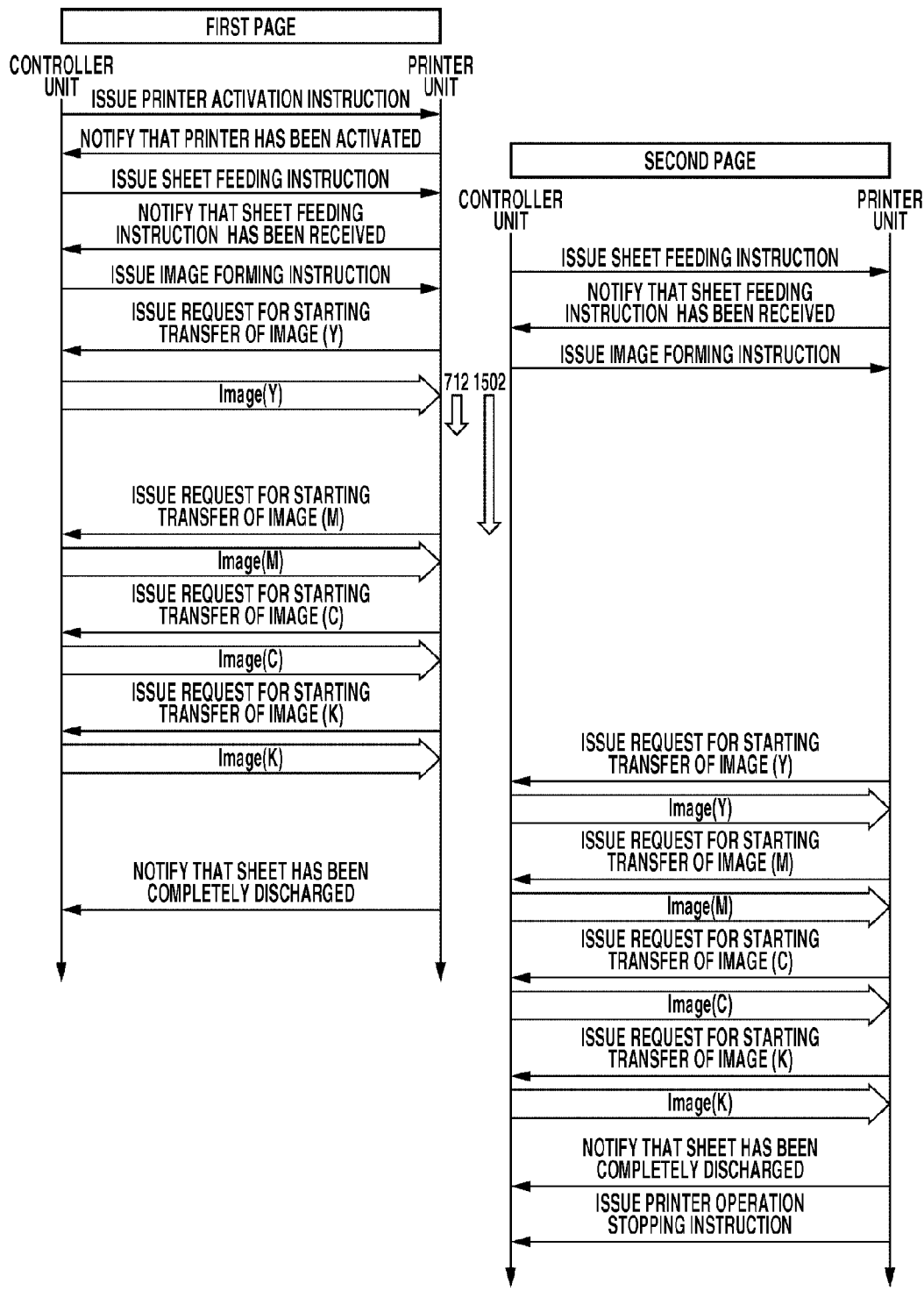
FIG. 10 illustrates exemplary control processing executed during image forming processing according to an exemplary embodiment of the present invention.

FIG. 10 illustrates exemplary control processing executed if no image forming instruction has been received during the time period 1505 although the printer unit 300 has waited until the image forming instruction is received from the controller unit 110 according to the present exemplary embodiment.

Hereinbelow, the time to be taken for transferring the images of two pages (the first page and the second page) in each of the one-image forming mode and the two-image forming mode is compared.

Figure 13A:
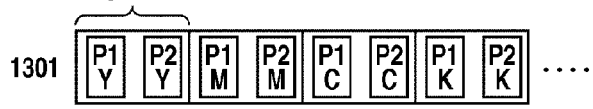
FIGS. 13A through 13D each illustrate time taken for executing the image forming processing according to an exemplary embodiment of the present invention.
Figure 13B:
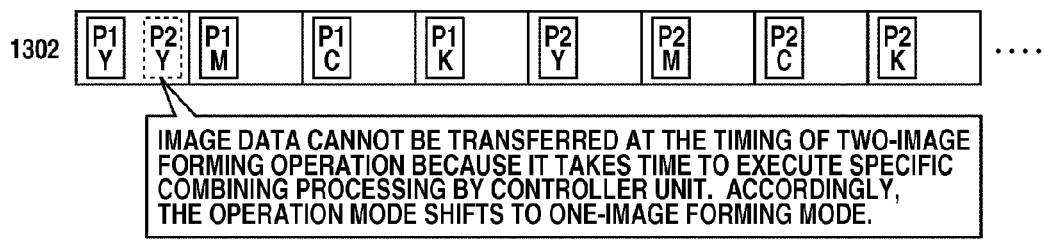

In the example illustrated in FIG. 13A, a time period 1301 indicates the time to be taken for transferring the images of two pages onto the intermediate transfer member 405 in the two-image forming mode. In the example illustrated in FIG. 13B, a time period 1302 indicates the time to be taken for transferring the images of two pages onto the intermediate transfer member 405 in the one-image forming mode.

In addition, a time period 1303 (FIG. 13C) indicates the time to be taken for transferring the images of two pages on the intermediate transfer member 405 by executing the control illustrated in FIGS. 9A and 9B. Furthermore, a time period 1304 (FIG. 13D) indicates the time to be taken in the case where the image forming instruction has not been received during the time period 1505 (FIGS. 9A and 9B) and thus the printer unit 300 has changed the print mode to the one-image forming mode.

If the user has designated to execute the image forming operation in the two-image forming mode, it is ideal that the image forming operation is executed in the time period 1301. However, if it has taken long to prepare the transmission of the image by the controller unit 110 and if the print mode has been changed to the one-image forming mode due to the delay in image transmission delay, it takes twice as long a time than the time 1301 to complete the image forming operation.

If the control illustrated in FIGS. 9A and 9B is executed, the images of two pages can be transferred onto the intermediate transfer member 405 in the time period 1303.

If the control illustrated in FIGS. 9A and 9B is executed, the time taken for completing the image forming operation can be reduced to the time of about five-eighths of the time taken in the case of executing the image forming operation in the one-image forming mode.

If the delay information has been previously notified from the controller unit 110 to the printer unit 300, then the MFP 100 may execute different control in order to prevent changing the print mode to the one-image forming mode and execute the image forming operation in the two-image forming mode.

In this case, the controller unit 110 does not transfer the image data to the printer unit 300 until the image data of two pages is ready to be transmitted. Furthermore, in this case, the controller unit 110 issues an image forming instruction to the printer unit 300 after the preparation of transmission of the image data of two pages has been completed.

However, in this case, it takes long until the printer unit 300 can start the printing of the first page image data. In addition, the MFP 100 delays the transmission of the first page image data even if it does not take long in preparing the second page image data and if the controller unit 110 can transmit the image data to the controller unit 110 at the timing at which the printer unit 300 can execute the image forming operation in the two-image forming mode.

In this case, although the image can essentially be formed at the ideal timing 1301 (FIG. 13A), the timing for starting the transfer of the first page image may be delayed.

Furthermore, in the present exemplary embodiment, the Y, M, C, and K toners are transferred onto the intermediate transfer member 405 in this order. However, the order for transferring the color toner images is not limited to this. That is, the order of transferring the color toner images can be changed or designated according to the characteristic of the printer unit 300.

In the present exemplary embodiment, the toner can be normally transferred onto the intermediate transfer member 405 and the images can be normally transferred onto the sheet by transferring the Y, M, C, and K toners onto the intermediate transfer member 405 in this order.

However, if the images can be more appropriately printed by transferring the color toners onto the intermediate transfer member 405 in exemplary order of M, C, K, and Y according to the characteristic of the printer unit 300, the toners can be transferred onto the intermediate transfer member 405 in this order.

Furthermore, if the MFP 100 can form an image on the intermediate transfer member 405 and on the sheet regardless of the order of transfer of the toners according to the characteristic of the printer unit 300, the controller unit 110 can executes control for transferring the toners onto the intermediate transfer member 405 without using a specific designated order of transferring the toners.

In this case, after transferring the Y toner image of the first page onto the intermediate transfer member 405, the intermediate transfer member 405 is rotated by 180° without transferring the toner thereon. Then, the M toner image is transferred onto the intermediate transfer member 405 so that the M toner image is superimposed on the Y toner image of the first page. Then, the M toner image of the second page is transferred side by side with the M toner image of the first page.

After having transferred the C toner images and the K toner images for the first and second pages, the Y toner image of the second page is transferred.

By executing the above-described control, the time to be taken until the sheet having the first page image is discharged on the sheet discharge unit 330 can be reduced.

In the case of the control executed according to the time period 1303 (FIG. 13C), the following control may be executed. That is, after transferring a first color toner of the first page onto the intermediate transfer member 405, the printer unit 300 may wait until the image data is transmitted from the controller unit 110 in a state where the rotation of the intermediate transfer member 405 is suspended.

However, if the rotation of the intermediate transfer member 405 is suspended, in resuming the rotation of the intermediate transfer member 405, extra time may become necessary for increasing the rotational speed of the intermediate transfer member 405 to a predetermined level. Thus, delay in the processing may occur.

In the present exemplary embodiment, while waiting for the image data from the controller unit 110, the printer unit 300 keeps rotating the intermediate transfer member 405. Accordingly, the present exemplary embodiment can prevent the delay in printing that may occur due to the suspension of the rotation of the intermediate transfer member 405.

Now, exemplary control executed by the controller unit 110 according to the present exemplary embodiment will be described in detail below with reference to the flow chart of FIG. 11. Processing in each step of the flow chart of FIG. 11 is executed by the CPU 112 of the controller unit 110 by loading and executing a program stored on the ROM 114.

Figure 11:
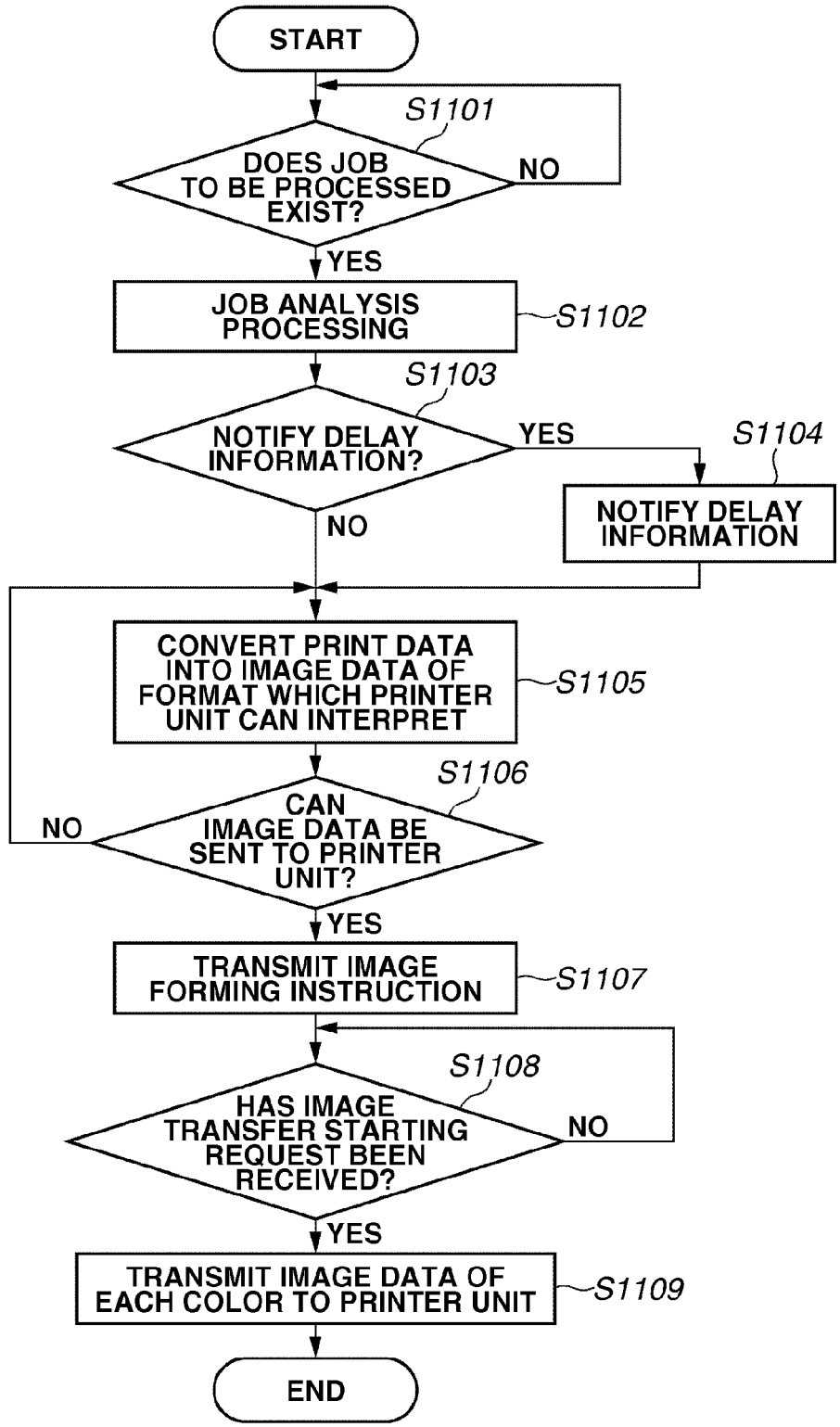
FIG. 11 is a flow chart illustrating exemplary processing for controlling a controller unit according to an exemplary embodiment of the present invention.

Referring to FIG. 11, in step S1101, the controller unit 110 determines whether any job to be processed has been input. More specifically, the controller unit 110 determines whether any job (code data including a print control command generated based on a predetermined PDL and print data) has been received from the PC 4001 or the PC 4002. The processing in step S1101 is repeated until the controller unit 110 receives a job.

If it is determined that a job has been received (YES in step S1101), then the processing advances to step S1102.

In step S1102, the controller unit 110 analyzes the received job. More specifically, the controller unit 110 stores the received job on the DRAM 116. Then, the controller unit 110 analyzes the print control command set to the received job. In addition, the controller unit 110 determines whether the print control command includes an instruction for combining the image indicating the page number, the image indicating the number of copies, or a specific image with the image to be printed. Then, the controller unit 110 stores a result of the determination on the DRAM 116.

In step S1103, the controller unit 110 determines whether to transmit the delay information, which indicates that the image forming instruction to the printer unit 300 may be delayed, to the printer unit 300. More specifically, if it is determined that the instruction for combining the image indicating the page number, the image indicating the number of copies, or a specific image with the image to be printed has been stored on the DRAM 116 as a result of the analysis on the job in step S1102 (YES in step S1103), then the processing advances to step S1104.

On the other hand, if it is determined that the instruction for combining the image indicating the page number, the image indicating the number of copies, or a specific image with the image to be printed has not been stored on the DRAM 116 as a result of the analysis on the job in step S1102 (NO in step S1103), then the processing advances to step S1105.

In step S1104, the controller unit 110 notifies the delay information to the printer unit 300. Then, the processing advances to step S1105. In step S1105, the controller unit 110 converts the print data included in the job into image data of a format that can be interpreted by the printer unit 300 according to the print control command.

If it has been instructed in the job to combine the image indicating the page number, the image indicating the number of copies, or a specific image with the image to be printed, the controller unit 110 executes control for combining the image indicating the page number, the image indicating the number of copies, or a specific image with the image data generated by combining the print data.

In step S1106, the controller unit 110 determines whether the processing on the image data according to the print control command has been completed and whether the image data is ready to be transmitted to the printer unit 300. If it is determined that the image data is ready to be transmitted to the printer unit 300 (YES in step S1106), then the processing advances to step S1107.

In step S1107, the controller unit 110 transmits an image forming instruction to the printer unit 300 to notify the printer unit 300 that the image data is ready to be transmitted thereto. In step S1108, the controller unit 110 waits until a request for starting image data transmission is received from the printer unit 300. More specifically, the controller unit 110 determines whether a request for starting image data transmission has been received from the printer unit 300.

If it is determined that a request for starting image data transmission has been received from the printer unit 300 (YES in step S1108), then the processing advances to step S1109. In step S1109, the controller unit 110 transmits the image data of each color to the printer unit 300.

Now, exemplary control executed by the printer unit 300 according to the present exemplary embodiment will be described in detail below with reference to the flow chart of FIG. 12. Processing in each step of the flow chart of FIG. 12 is executed by the printer controller 320A by loading and executing a program stored on a memory (not illustrated).

Referring to FIG. 12, in step S1801, the printer controller 320A determines whether a sheet feeding instruction has been received from the controller unit 110. If it is determined that a sheet feeding instruction has been received from the controller unit 110 (YES in step S1801), then the processing advances to step S1802.

In step S1802, the printer controller 320A determines whether the delay information has been received from the controller unit 110. If it is determined that the delay information has been received from the controller unit 110 (YES in step S1802), then the printer controller 320A stores the received delay information on the memory (not illustrated) of the printer unit 300. Then, the processing advances to step S1804.

In step S1804, the printer controller 320A controls the sheet feed unit 310 to feed the sheet of a size designated in the print setting. Furthermore, the printer controller 320A issues a sheet feeding operation start notification to the controller unit 110.

After receiving a first page image forming instruction from the controller unit 110, the printer controller 320A, in step S1805, issues a request for transmitting a first color image to the controller unit 110. Furthermore, the printer controller 320A transfers the first color toner onto the intermediate transfer member 405 based on the image data received from the controller unit 110.

In step S1806, the printer controller 320A determines whether an instruction for forming an image of a subsequent page has been received during a predetermined time period (the time period 712 (FIG. 9A)). The predetermined time period is a time period in which after having transferred the first page Y image onto the intermediate transfer member 405, the second page Y image can be transferred so that the second page Y image is not superimposed on the first page Y image. The time length of the predetermined time period differs according to the rotation speed of the intermediate transfer member 405.

If it is determined that an instruction for forming an image of a subsequent page has been received during a predetermined time period (YES in step S1806), the printer controller 320A determines that the image forming operation can be executed in the two-image forming mode. Then in step S1810, the printer controller 320A executes control for forming the image in the two-image forming mode.

On the other hand, if it is determined that an instruction for forming an image of a subsequent page has not been received during a predetermined time period (NO in step S1806), then the processing advances to step S1807. In step S1807, the printer controller 320A determines whether the delay information has been received from the controller unit 110. More specifically, if the delay information received in step S1803 has been stored on the memory, the printer controller 320A determines that the delay information has been received from the controller unit 110.

If it is determined that the delay information has been received from the controller unit 110 (YES in step S1807), then the processing advances to step S1808. On the other hand, if it is determined that the delay information has not been received from the controller unit 110 (NO in step S1807), then the processing advances to step S1812.

In step S1808, the printer controller 320A rotates the intermediate transfer member 405 one revolution without transferring the toner from the development unit 403. Then, the processing advances to step S1809.

In step S1809, the printer controller 320A determines whether an instruction for forming an image of the subsequent page has been received from the controller unit 110 during one revolution of the intermediate transfer member 405.

If it is determined that an instruction for forming an image of the subsequent page has been received from the controller unit 110 during one revolution of the intermediate transfer member 405 (YES in step S1809), then the processing advances to step S1811. On the other hand, if it is determined that an instruction for forming an image of the subsequent page has not been received from the controller unit 110 during one revolution of the intermediate transfer member 405 (NO in step S1809), then the processing advances to step S1812.

Figure 13C:
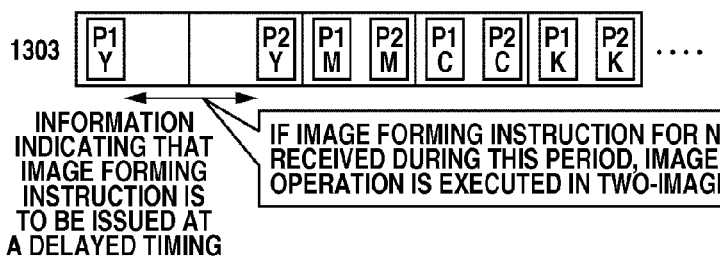

In step S1811, the printer controller 320A transfers the second page image onto the intermediate transfer member 405 so that the second page image, which has been received after the above-described one revolution of the intermediate transfer member 405, is transferred side by side with the first page image onto the intermediate transfer member 405. Furthermore, the printer controller 320A forms subsequent images in the two-image forming mode as indicated by the time period 1303 (FIG. 13C).

Figure 13D:
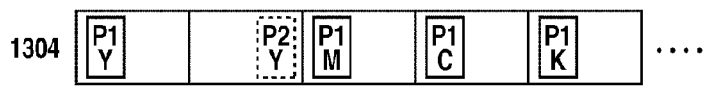

On the other hand, in step S1812, the printer controller 320A executes the image forming operation in the one-image forming mode as indicated by the time period 1304 (FIG. 13D).

As described above, the printer controller 320A of the printer unit 300 executes control for preventing shifting to the one-image forming mode as much as possible even if the timing for transmitting the print data from the controller unit 110 to the printer unit 300 is delayed.

Accordingly, the present exemplary embodiment can reduce the degradation of productivity that may occur in the case of shifting to the one-image forming mode if the timing for transmitting the print data from the controller unit 110 to the printer unit 300 is delayed.

Now, a second exemplary embodiment of the present invention will be described in detail below. In the above-described first exemplary embodiment, an image is formed using four color toners of C, M, Y, and K. In the second exemplary embodiment, an image is formed using CL toner (transparent toner) in addition to the four color toners of C, M, Y, and K.

The exemplary apparatus configuration described above with reference to FIGS. 1 through 4 and the data processing described above with reference to FIGS. 5, 11, and 12, which are described above in the first exemplary embodiment, are also applied to the second exemplary embodiment. Accordingly, the description thereof will not be repeated here.

Figure 14A:
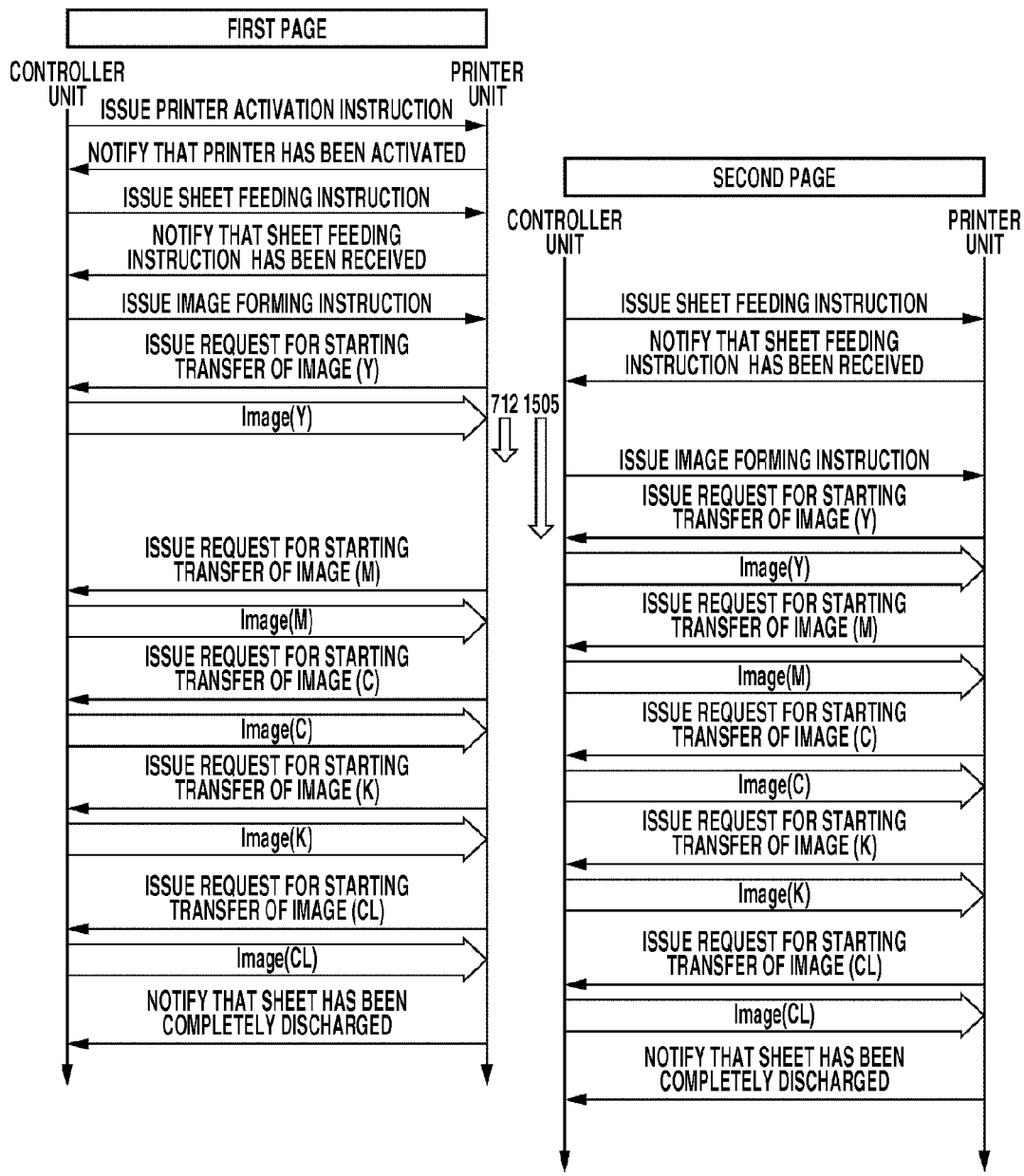
FIGS. 14A and 14B illustrate exemplary control processing executed during image forming processing according to an exemplary embodiment of the present invention.
Figure 14B:
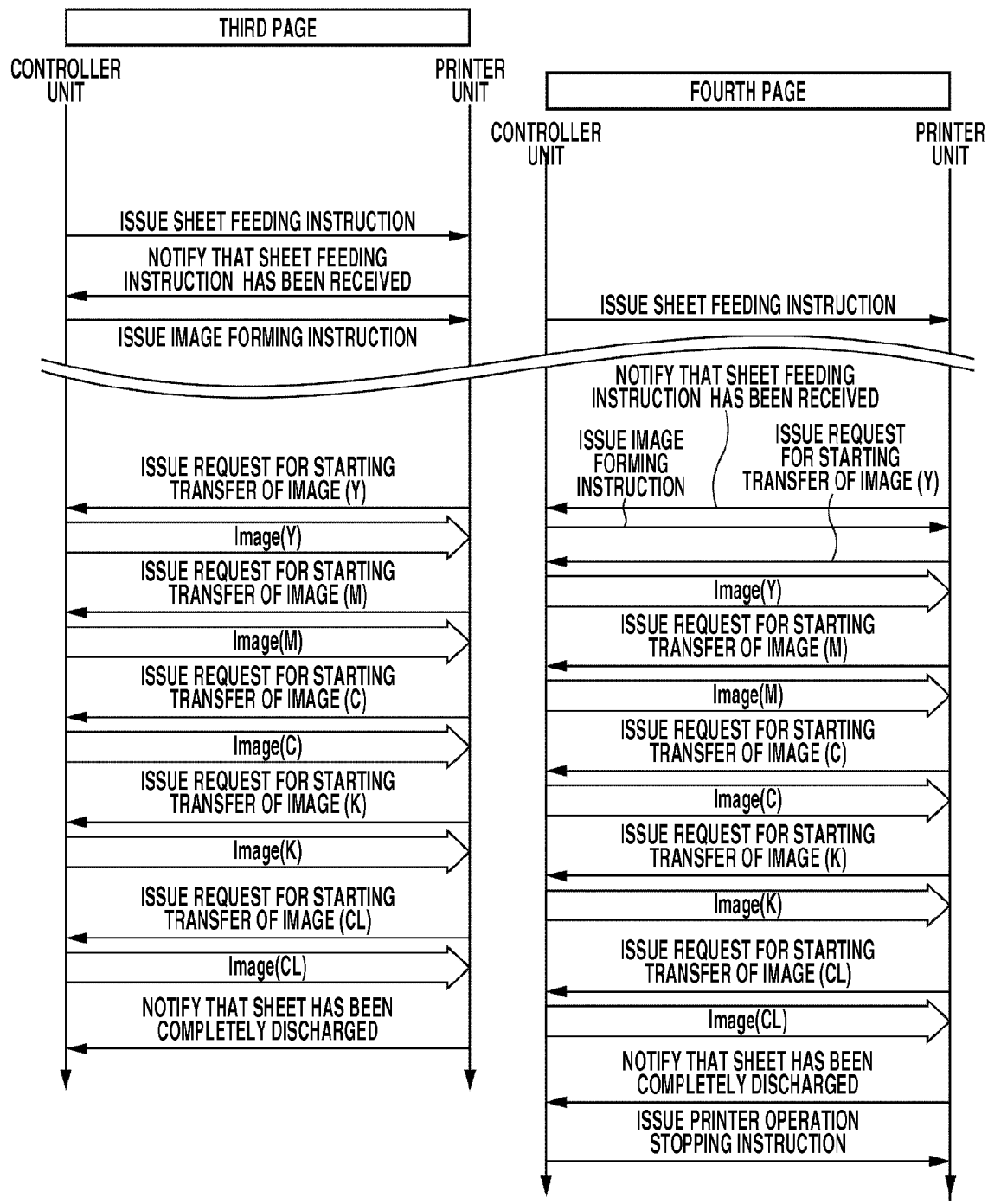

FIGS. 14A and 14B illustrate the flow of data between the controller unit 110 and the printer unit 300 in the MFP 100 according to the present exemplary embodiment. Referring to FIGS. 14A and 14B, when the user has input a print instruction, the controller unit 110 issues a print start instruction to the printer unit 300. After receiving the print start instruction, the printer unit 300 issues a print start notification to the controller unit 110.

After receiving the print start notification, the controller unit 110 issues a sheet feeding instruction. If it has been instructed by the user to execute printing by using the transparent toner, the controller unit 110 transmits information indicating that the image forming instruction may be delayed (the delay information) to the printer unit 300. That is, the processing advances from step S1802 to step S1803 as illustrated in FIG. 12.

In the present exemplary embodiment, the controller unit 110 determines whether the image forming instruction is to be delayed according to whether it has been instructed in the print setting that the CL toner is to be used in the printing. This is because if it has been instructed to print the image by using the transparent toner, it is necessary for the controller unit 110 to execute processing for generating and combining the transparent toner image in addition to executing the processing for generating the image of the four color toner images of C, M, Y, and K and accordingly, the time taken for preparing the transmission of image data to the printer unit 300 is long.

Then, the controller unit 110 receives a sheet feeding instruction receiving notification from the printer unit 300. When the image data is ready to be transmitted to the printer unit 300, the controller unit 110 issues an image forming instruction to the printer unit 300.

In the example illustrated in FIGS. 14A and 14B, the operation executed when the printer unit 300 has received the image forming instruction from the controller unit 110 during the time period 1505. As in the first exemplary embodiment, the time period 1505 is a time period including the time taken for additionally rotating the intermediate transfer member 405 one revolution in addition to the length of the time period 712, which is a period from the start of transfer of the first image onto the intermediate transfer member 405 by the printer unit 300 to the timing for transferring the second page image onto the intermediate transfer member 405 so that the second page image is not superimposed on the first page image.

After receiving the image forming instruction, the printer unit 300 transmits a request for starting transmission of an image to the controller unit 110. Then, the printer unit 300 transfers each of the Y, M, C, K, and CL toners onto the intermediate transfer member 405 at an appropriate timing. After forming the Y, M, C, K, and CL toner images on the intermediate transfer member 405, the printer unit 300 transfers the image transferred on the intermediate transfer member 405 onto the sheet. Then, the printer unit 300 fixes the image on the sheet. Furthermore, the printer unit 300 discharges the sheet having the fixed image onto the sheet discharge unit 330.

When the sheet is completely discharged, the printer unit 300 issues a sheet discharge completion notification to the controller unit 110.

In the present exemplary embodiment, if an image is not ready to be transmitted to the controller unit 110 and the printer unit 300 has not received the image forming instruction from the controller unit 110 during the time period 1505, then the printer unit 300 transfers the image of the first page onto the intermediate transfer member 405 in the one-image forming mode.

FIGS. 15A through 15D each illustrate the time taken for forming an image in the following image forming mode under control of the printer controller 320A according to the present exemplary embodiment.

Figure 15A:
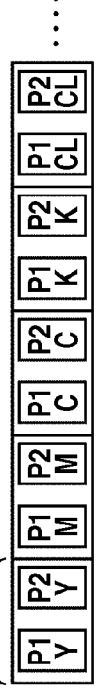
FIGS. 15A through 15D each illustrate time taken for executing the image forming processing according to an exemplary embodiment of the present invention.
Figure 15B:
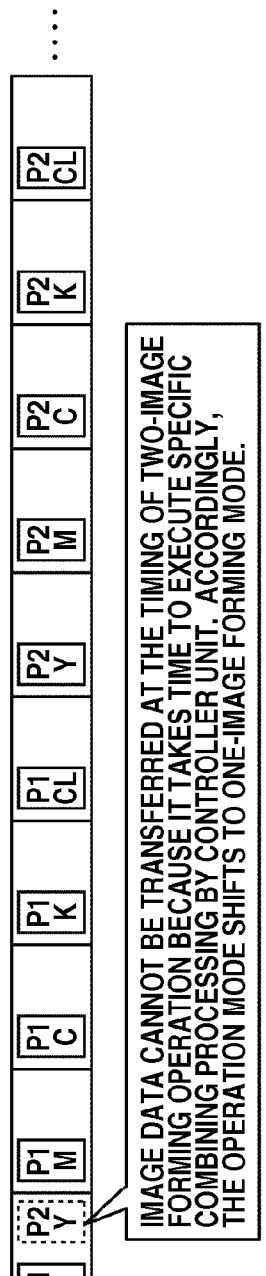
Figure 15C:
Figure 15D:

Referring to FIG. 15A, a time period 2001 indicates the time taken for transferring images of two pages onto the intermediate transfer member 405 in the two-image forming mode. A time period 2002 (FIG. 15B) indicates the time taken for transferring images of two pages onto the intermediate transfer member 405 in the one-image forming mode.

A time period 2003 (FIG. 15C) indicates the time taken for transferring images of two pages onto the intermediate transfer member 405 by executing the control illustrated in FIGS. 14A and 14B. A time period 2004 (FIG. 15D) indicates the time taken if no image forming instruction has been received during the time period 1505 (FIGS. 14A and 14B) and thus the print mode has been changed to the one-image forming mode.

If the user has designated to execute the image forming operation in the two-image forming mode, it is ideal that the image forming operation is executed in the time 2001. However, if it has taken long to prepare the transmission of the image by the controller unit 110 and the print mode has been changed to the one-image forming mode due to the delay in image transmission delay, as indicated by the time period 2002, then it takes twice as long a time than the time 2001 to complete the image forming operation.

If the control illustrated in FIGS. 14A and 14B is executed, images of two pages can be transferred onto the intermediate transfer member 405 in the time period 2003.

If the control illustrated in FIGS. 14A and 14B is executed, the time taken for completing the image forming operation can be reduced to the time of about three-fifths of the time taken in the case of executing the image forming operation in the one-image forming mode.

As described above, the printer controller 320A of the printer unit 300 executes control for preventing shifting to the one-image forming mode as much as possible even if the timing for transmitting the print data from the controller unit 110 to the printer unit 300 is delayed.

Accordingly, the present exemplary embodiment can reduce the degradation of productivity that may occur in the case of shifting to the one-image forming mode if the timing for transmitting the print data from the controller unit 110 to the printer unit 300 is delayed.

If the delay information has been previously notified from the controller unit 110 to the printer unit 300, then the MFP 100 may execute different control in order to prevent changing the print mode to the one-image forming mode and execute the image forming operation in the two-image forming mode.

In this case, the controller unit 110 does not transfer the image data to the printer unit 300 until the image data of two pages is ready to be transmitted. Furthermore, in this case, the controller unit 110 issues an image forming instruction to the printer unit 300 after the preparation of transmission of the image data of two pages has been completed.

However, in this case, it takes long until the printer unit 300 can start printing of the first page image data. In addition, the MFP 100 delays the transmission of the first page image data even if it does not take long in preparing the second page image data and the controller unit 110 can transmit the image data to the controller unit 110 at the timing at which the printer unit 300 can execute the image forming operation in the two-image forming mode.

In this case, although the image can essentially be formed at the ideal timing 2001 (FIG. 15A), the timing for starting the transfer of the first page image may be delayed.

In the case of the control executed according to the time period 2003 (FIG. 15C), the following control may be executed. That is, after transferring a first color toner of the first page onto the intermediate transfer member 405, the printer unit 300 may wait until the image data is transmitted from the controller unit 110 in a state where the rotation of the intermediate transfer member 405 is suspended.

However, if the rotation of the intermediate transfer member 405 is suspended, in resuming the rotation of the intermediate transfer member 405, extra time may become necessary for increasing the rotational speed of the intermediate transfer member 405 to a predetermined level. Thus, delay in the processing may occur.

In the present exemplary embodiment, while waiting for the image data from the controller unit 110, the printer unit 300 keeps rotating the intermediate transfer member 405. Accordingly, the present exemplary embodiment can prevent the delay in printing that may occur due to the suspension of the rotation of the intermediate transfer member 405.

Note that in the above-described exemplary embodiments of the present invention, if the total number of pages is an odd number, no page may be input after the last page. In this case, if the printer unit 300 waits for the time period 1505 to execute the two-image forming mode, the productivity may be degraded.

In order to prevent this, it is also useful if the following control is executed. That is, if a page to be printed in the two-image forming mode is the last page of a job, the controller unit 110 notifies the printer unit 300 that the image data to be transmitted is image data of the last page to control the printer unit 300 to execute the printing of the page in the one-image forming mode.

Accordingly, the present exemplary embodiment can execute the printing of the last page of the job in the one-image forming mode according to the information notified from the controller unit 110, instead of waiting during the time period 1505 to print the page in the two-image forming mode. Thus, the present exemplary embodiment can reduce the time taken for printing the last page of the job.

Furthermore, in the above-described exemplary embodiments of the present invention, if the controller unit 110 cannot transmit the image forming instruction to the printer unit 300 during the time period 712 because the image data to be transmitted to the printer unit 300 is not ready, the following control is executed.

That is, the printer controller 320A of the printer unit 300 determines that the two-image forming mode cannot be executed at that timing. Furthermore, the printer unit 300 waits for an image forming instruction to be received from the controller unit 110 while rotating the intermediate transfer member 405 one revolution.

However, the length of the period for waiting for an image forming instruction to be received is not limited to this. That is, it is also useful if the printer unit 300 waits for an image forming instruction to be received from the controller unit 110 while rotating the intermediate transfer member 405 by a predetermined number of revolutions, such as two or more revolutions. Alternatively, the number of revolutions of the intermediate transfer member 405 for waiting for an image forming instruction to be received from the controller unit 110 can be set by the user via the operation unit 270.

In addition, it is also useful if different numbers of revolutions can be set according to the print setting. In this case, the user can set the print setting for waiting for an image forming instruction to be received during two revolutions of the intermediate transfer member 405 in the case of combining the image indicating the page number or the image indicating the number of copies with the image to be printed, for example. Furthermore, in this case, the user can set the print setting for waiting for an image forming instruction to be received during three revolutions of the intermediate transfer member 405 in the case of executing the image forming operation using the transparent toner, for example.

FIG. 16 illustrates a memory map of a storage medium storing various data processing programs that can be read by the MFP 100 according to an exemplary embodiment of the present invention.

Although not illustrated in FIG. 16, information for managing the programs stored in the storage medium such as version information and information concerning the creator of a program, for example, can be stored in the storage medium. In addition, information that depends on an operating system (OS) of an apparatus that reads the program, such as an icon for identifying and displaying the program, can be stored in the storage medium.

In addition, data that is subordinate to the various programs is also managed in a directory of the storage medium. In addition, a program for installing the various programs on a computer can be stored in the storage medium. Furthermore, in the case where a program to be installed is compressed, a program for decompressing the compressed program can be stored in the storage medium.

In addition, the functions according to the above-described exemplary embodiments illustrated in FIGS. 11 and 12 can be implemented by a host computer using a program that is externally installed. In this case, the present invention is applied to the case where a group of information including a program is supplied to an output device from a storage medium, such as a compact disc-read only memory (CD-ROM), a flash memory, and a floppy disk (FD), or from an external storage medium via a network.

The present invention can also be achieved by providing a system or an apparatus with a storage medium storing program code of software implementing the functions of the embodiments and by reading and executing the program code stored in the storage medium with a computer of the system or the apparatus (a CPU or a micro processing unit (MPU)).

In this case, the program code itself, which is read from the storage medium, implements the functions of the embodiments described above, and accordingly, the storage medium storing the program code constitutes the present invention.

As the storage medium for supplying such program code, a floppy disk, a hard disk, an optical disk, a magneto-optical disk (MO), a CD-ROM, a compact disc recordable (CD-R), a compact disc rewritable (CD-RW), a magnetic tape, a nonvolatile memory card, a ROM, a digital versatile disc (DVD (DVD-recordable (DVD-R), DVD-rewritable (DVD-RW))), and an EEPROM, for example, can be used.

In addition, the functions according to the embodiments described above can be implemented not only by executing the program code read by the computer, but also implemented by the processing in which an OS or the like carries out a part of or the whole of the actual processing based on an instruction given by the program code.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-138252 filed May 27, 2008, which is hereby incorporated by reference herein in its entirety.

What is claimed is:

1. An image forming apparatus configured to form an image on a sheet by transferring an image generated based on input image data onto an intermediate transfer member page by page and further transferring the image transferred onto the intermediate transfer member onto the sheet, the image forming apparatus comprising:
   a transfer unit for transferring images to the intermediate transfer member;
   a receiving unit configured to receive delay information;
   a control unit configured to cause the transfer unit to transfer an image of a first page to the intermediate transfer member based on the input image data; and
   a determination unit configured to determine whether the transfer unit can transfer an image of a second page, which follows the first page, side by side with the image of the first page in a time in which the intermediate transfer member having the transferred image of the first page is rotated to move a transfer position for the image of the second page on the intermediate transfer member to a predetermined position,
   wherein the control unit is configured to control, if a result of the determination by the determination unit is negative and the delay information has been received by the receiving unit, the transfer unit to transfer, after transferring the image of the first page onto the intermediate transfer member, the image of the second page side by side with the image of the first page after rotating the intermediate transfer member at least one revolution, and configured to control, if the result of the determination by the determination unit is negative and the delay information has not been received by the receiving unit, the transfer unit to transfer, after transferring the image of the first page onto the intermediate transfer member, the transferred image of the first page onto the sheet without transferring the image of the second page side by side with the image of the first page.

2. The image forming apparatus according to claim 1, wherein the control unit is configured to cause, if the result of the determination by the determination unit is negative and the delay information has been received by the receiving unit, the intermediate transfer member to rotate by a predetermined number of revolutions, and
   wherein the control unit is configured to cause, if the image of the second page cannot be transferred even after rotating the intermediate transfer member the predetermined number of revolutions, transfer of the image of the first page, which has been transferred onto the intermediate transfer member, onto the sheet without transferring the image of the second page side by side with the image of the first page.

3. The image forming apparatus according to claim 1, wherein the determination unit is configured to determine whether the transfer unit can transfer the image of the second page onto the intermediate transfer member side by side with the first image according to whether image data corresponding to the image of the second page is input in the time in which the intermediate transfer member having the transferred image of the first page is rotated to move the transfer position for the image of the second page on the intermediate transfer member to the predetermined position.

4. The image forming apparatus according to claim 1, wherein the receiving unit is configured to receive the delay information in a case that a setting is made to transfer a transparent recording agent onto the sheet.

5. The image forming apparatus according to claim 1, wherein the receiving unit is configured to receive the delay information in a case that a setting is made to print a page number or a number of copies on the sheet.

6. The image forming apparatus according to claim 1, wherein the control unit is configured to control, if a result of the determination by the determination unit is positive, the transfer unit to transfer, after transferring the image of the first page onto the intermediate transfer member, the image of the second page side by side with the image of the first page before rotating the intermediate transfer member at least one revolution.

7. A method for controlling an image forming apparatus configured to form an image on a sheet by transferring an image generated based on input image data onto an intermediate transfer member page by page and further transferring the image transferred onto the intermediate transfer member onto the sheet, the method comprising:
transferring, by a transfer unit, an image of a first page onto the intermediate transfer member based on the input image data;
determining whether the image of a second page, which follows the first page, can be transferred side by side with the image of the first page in a time in which the intermediate transfer member having the transferred image of the first page is rotated to move a transfer position for the image of the second page on the intermediate transfer member to a predetermined position;
controlling, if a result of the determination is negative and delay information has been received, the image of the second page to be transferred side by side with the image of the first page after rotating the intermediate transfer member at least one revolution after transferring the image of the first page onto the intermediate transfer member; and
controlling, if the result of the determination is negative and the delay information has not been received, the transferred image of the first page to be transferred onto the sheet, without transferring the image of the second page side by side with the transferred image of the first page, after transferring the image of the first page onto the intermediate transfer member.

8. The method according to claim 7, further comprising:
causing, if the result of the determination is negative and the delay information has been received, the intermediate transfer member to rotate by a predetermined number of revolutions; and
causing, if the image of the second page cannot be transferred even after rotating the intermediate transfer member by the predetermined number of revolutions, transfer of the image of the first page, which has been transferred onto the intermediate transfer member, onto the sheet without transferring the image of the second page side by side with the image of the first page.

9. The method according to claim 7, further comprising determining whether the image of the second page can be transferred onto the intermediate transfer member side by side with the first image according to whether image data corresponding to the image of the second page is input in the time in which the intermediate transfer member having the transferred image of the first page is rotated to move the transfer position for the image of the second page on the intermediate transfer member to the predetermined position.

10. The method according to claim 7, wherein the delay information is received in a case that a setting is made to transfer a transparent recording agent onto the sheet.

11. The method according to claim 7, wherein the delay information is received in a case that a setting is made to print a page number or a number of copies on the sheet.

12. The method according to claim 7, further comprising:
controlling, if a result of the determination is positive, the transfer unit to transfer, after transferring the image of the first page onto the intermediate transfer member, the image of the second page side by side with the image of the first page before rotating the intermediate transfer member at least one revolution.

13. A non-transitory computer-readable storage medium storing instructions which, when executed by an image forming apparatus configured to form an image on a sheet by transferring an image generated based on input image data onto an intermediate transfer member page by page and further transferring the image transferred onto the intermediate transfer member onto the sheet, cause the image forming apparatus to perform operations comprising:
transferring, by a transfer unit, an image of a first page onto the intermediate transfer member based on the input image data;
determining whether the image of a second page, which follows the first page, can be transferred side by side with the image of the first page in a time in which the intermediate transfer member having the transferred image of the first page is rotated to move a transfer position for the image of the second page on the intermediate transfer member to a predetermined position;
controlling, if a result of the determination is negative and delay information has been received, the image of the second page to be transferred side by side with the image of the first page after rotating the intermediate transfer member at least one revolution after transferring the image of the first page onto the intermediate transfer member; and
controlling, if the result of the determination is negative and the delay information has not been received, the transferred image of the first page to be transferred onto the sheet, without transferring the image of the second page side by side with the transferred image of the first page, after transferring the image of the first page onto the intermediate transfer member.

14. An image forming apparatus configured to form an image on a sheet by transferring an image generated based on input image data onto an intermediate transfer member page by page and further transferring the image transferred onto the intermediate transfer member onto the sheet, the image forming apparatus comprising:
a transfer unit configured to transfer images to the intermediate transfer member;
a control unit configured to cause the transfer unit to transfer an image of a first page to the intermediate transfer member based on the input image data, and to rotate the intermediate transfer member at least one revolution after transferring the image of the first page onto the intermediate transfer member without transferring an image of a second page; and
a determination unit configured to determine whether the transfer unit can transfer the image of the second page, which follows the first page, side by side with the image of the first page in a time in which the intermediate transfer member having the transferred image of the first page is rotated at least one revolution, wherein the control unit is configured to control, if a result of the determination by the determination unit is positive, the transfer unit to transfer the image of the second page side by side with the image of the first page, and configured to control, if the result of the determination by the determination unit is negative, the transfer unit to transfer the transferred image of the first page onto the sheet without transferring the image of the second page side by side with the image of the first page.

* * * * *